US012065299B2

(12) United States Patent
Farish et al.

(10) Patent No.: US 12,065,299 B2
(45) Date of Patent: Aug. 20, 2024

(54) PROTECTIVE DOOR PACKAGING FOR PREHUNG DOOR ASSEMBLIES AND METHOD OF PACKAGING PREHUNG DOOR ASSEMBLIES

(71) Applicant: Masonite Corporation, Tampa, FL (US)

(72) Inventors: Steven Farish, Charlotte, NC (US); Tom Abbas, Enola, PA (US); Garrett Burba, Shermans Dale, PA (US); Randy Findley, York Springs, PA (US); Keith Dusharm, Carlisle, PA (US); Rick Leo, Newport, PA (US)

(73) Assignee: MASONITE CORPORATION, Tampa, FL (US)

( * ) Notice: Subject to any disclaimer, the term of this patent is extended or adjusted under 35 U.S.C. 154(b) by 0 days.

(21) Appl. No.: 18/077,408

(22) Filed: Dec. 8, 2022

(65) Prior Publication Data

US 2023/0182986 A1 Jun. 15, 2023

Related U.S. Application Data

(60) Provisional application No. 63/288,183, filed on Dec. 10, 2021.

(51) Int. Cl.

| | |
|---|---|
| ***B65D 81/05*** | (2006.01) |
| ***B65B 55/00*** | (2006.01) |
| ***B65D 85/64*** | (2006.01) |
| ***E06B 7/28*** | (2006.01) |

(52) U.S. Cl.

CPC ............ *B65D 81/058* (2013.01); *B65B 55/00* (2013.01); *B65D 85/64* (2013.01); *E06B 7/28* (2013.01)

(58) Field of Classification Search

CPC ...... B65B 55/00; B65D 81/05; B65D 81/054; B65D 81/055; B65D 81/057; B65D 81/058; B65D 85/64; E06B 1/52; E06B 7/28

USPC .................................................. 206/325, 499

See application file for complete search history.

(56) References Cited

U.S. PATENT DOCUMENTS

| | | | |
|---|---|---|---|
| 2,489,029 | A | 11/1949 | Guerrant |
| 2,742,146 | A | 4/1956 | Lester, Jr. |
| 2,757,854 | A | 8/1956 | Wall |
| 2,929,495 | A | 1/1958 | Simonsen |
| 2,887,241 | A | 5/1959 | MacKenzie |
| 3,017,022 | A | 1/1962 | Amundson |
| 3,111,724 | A | 11/1963 | Piekarski |
| 3,301,820 | A | 1/1967 | Haendiges |

(Continued)

*Primary Examiner* — Bryon P Gehman

(74) *Attorney, Agent, or Firm* — CANTOR COLBURN LLP

(57) ABSTRACT

A single unit protective door package for packaging of a single prehung door assembly. The door assembly comprises a door frame and a door slab pivotally attached to the door frame. The door frame includes right and left side jambs and a head jamb connecting upper ends of the right and left side jambs. The single unit protective door package comprises the door assembly, upper protective side caps each mounted to the door assembly at one of opposite upper corners of the door frame, lower protective side caps each mounted to the door assembly at one of lowermost edges of the door frame, and two support spacers each mounted to one of the lowermost edges of the door frame for elevating a bottom edge of the door slab above the ground to a distance compatible with a forklift, pallet jack or hand truck.

24 Claims, 24 Drawing Sheets

(56) References Cited

U.S. PATENT DOCUMENTS

| | | | | | |
|---|---|---|---|---|---|
| 4,127,188 | A | | 11/1978 | Heaney | |
| 4,884,687 | A | | 12/1989 | Steves | |
| 4,967,905 | A | | 11/1990 | Steves | |
| 5,605,229 | A | | 2/1997 | Sowa | |
| 5,740,631 | A | * | 4/1998 | Mori | E06B 1/56 206/325 |
| 5,809,698 | A | * | 9/1998 | Mori | E06B 7/00 49/504 |
| 6,029,410 | A | | 2/2000 | Westberg et al. | |
| 6,135,030 | A | | 10/2000 | Besaw | |
| 6,216,899 | B1 | | 4/2001 | Bragazza | |
| 6,581,769 | B2 | | 6/2003 | Nist | |
| 10,029,818 | B2 | | 7/2018 | Kelly et al. | |
| 10,399,717 | B2 | | 9/2019 | Chubb et al. | |
| 2017/0081105 | A1 | | 3/2017 | Gill | |
| 2024/0026692 | A1 | * | 1/2024 | Jabbour | E06B 1/60 |

* cited by examiner

PROTECTIVE DOOR PACKAGING FOR PREHUNG DOOR ASSEMBLIES AND METHOD OF PACKAGING PREHUNG DOOR ASSEMBLIES

CROSS-REFERENCE TO RELATED APPLICATION AND CLAIM TO PRIORITY

This Application claims the benefit of U.S. Provisional Patent Application Ser. No. 63/288,183 filed Dec. 10, 2021, by Farish et al., which is hereby incorporated herein by reference in its entirety and to which priority is claimed.

BACKGROUND OF THE INVENTION

1. Field of the Invention

The present invention is related generally to protective packaging devices and, more particularly, to a protective door package for prehung door assemblies that protects a door assembly or a united group of prehung door assemblies from damage during shipping and handling, and eliminates the need for a wood pallet to hold the protective door package(s). The invention is also directed to methods of packaging prehung door assemblies.

2. Description of the Related Art

Door manufacturers and retailers are known to transport and sell prehung door assemblies, i.e., in assembled form with a door, door frame, and moldings or trim. To protect the prehung door assemblies from damage during shipping and handling, it is common for the manufacturer or retailer to place protective guards around outer surfaces, or portions thereof, of the door assemblies. Commonly, a combination of four protective guards is employed, with each guard being positioned at one of the four corner regions of each door assembly. Typically, the protective guards are made of corrugated cardboard folded and glued into four-sided "boxes" that fit relatively loosely around the respective corner regions of the door assembly and are held in place with banding, such as provided by nylon straps. Although the cardboard guards offer a degree of protection to the door assembly as it is manipulated during shipping and handling, there are a variety of problems associated with the cardboard guards. Moreover, the existing door packages frequently require wood pallets to hold unitized door packages, i.e., a number of prehung door assemblies shipped as a unit.

Consequently, there is a need for a novel prehung door guard structure that offers a greater degree of protection than present cardboard guards, and which may be securely and tightly retained about the corner regions of a prehung door assembly. The present invention is directed to providing a door guard that satisfies the aforementioned needs and overcomes or at least reduces the effects of one or more of the problems set forth above.

Various types of door packaging have been developed and used to transport prehung door assemblies. While existing door packaging devices have proven to be acceptable, improvements that may enhance their performance and cost are possible. Therefore, the need exists for a door packaging for prehung door assemblies that improves door packaging quality, enhances unitization, reduces unnecessary packaging, and eliminates the need for a wood pallet to hold a unitized door package.

BRIEF SUMMARY OF THE INVENTION

According to a first aspect of the present invention, a single unit protective door package is provided for packaging of a single prehung door assembly. The single prehung door assembly comprises a rectangular door frame including right and left side jambs and a head jamb connecting upper ends of the right and left side jambs, and a door slab pivotally attached to the door frame. The single unit protective door package comprises the single prehung door assembly, a pair of upper protective side caps each mounted to the door assembly at one of opposite upper corners of the door frame, a pair of lower protective side caps each mounted to the door assembly at one of lowermost edges of the door frame, and a pair of support spacers each mounted to one of the lowermost edges of the door frame for elevating the bottom edge of the door slab above the ground a distance compatible with use of a forklift, pallet jack or hand truck.

According to a second aspect of the present invention, there is provided a unitized door packaging of a plurality of single unit protective door packages each package comprising a single prehung door assembly. The single prehung door assembly comprises a rectangular door frame and a door slab pivotally attached to the door frame. The door frame includes right and left side jambs and a header jamb connecting upper ends of the right and left side jambs. The unitized door packaging comprises the plurality of the single unit protective door packages stacked and aligned with each other. Each of the single unit protective door packages comprises a single prehung door assembly including a pair of upper protective side caps each configured to be mounted to the single prehung door assembly at one of opposite upper corners of the door frame, a pair of lower protective side caps each configured to be mounted to the door assembly at one of lowermost edges of the door frame, and a pair of support spacers each mounted to one of the lowermost edges of the door frame for elevating a bottom edge of the door slab above the ground to a distance compatible with a forklift, pallet jack or hand truck. The unitized door packaging further comprises top and bottom tightening straps securing the plurality of the stacked single unit protective door packages together, such as by encircling the stacked single unit protective door packages with the top and bottom tightening straps over the upper and lower protective side caps, respectively, of the stacked single unit protective door packages. The single unit protective door packages are aligned with each other so that bottom surfaces of the support spacers of the single unit protective door packages are aligned and coplanar.

According to a third aspect of the present invention, a method is provided for assembling a protective door package of a prehung door assembly. The method comprises the step of providing a single prehung door assembly comprising a rectangular door frame and a door slab pivotally attached to the door frame. The door frame includes right and left side jambs and a head jamb connecting upper ends of the right and left side jambs. The method further comprises the steps of mounting each of lower protective side caps to the door assembly at one of lowermost edges of the door frame, mounting each of support spacers at one of the right and left side jambs of the door frame so as to extend away from the lowermost edge of the door frame, mounting each of upper protective side caps to the door assembly at one of opposite upper corners of the door frame, and securing the upper and lower protective side caps to the prehung door assembly by encircling the prehung door assembly with top and bottom tightening straps over the lower and upper protective side caps, respectively.

According to a fourth aspect of the present invention, a method is provided for assembling a unitized door packaging comprising a plurality of single unit protective door packages, each package comprising a single prehung door assembly. The single prehung door assembly comprises a rectangular door frame and a door slab pivotally attached to the door frame. The door frame includes right and left side jambs and a head jamb connecting upper ends of the right and left side jambs. The method comprises the step of providing the plurality of the single unit protective door packages. Each of the single unit protective door packages comprises a pair of upper protective side caps each mounted to the door assembly at one of opposite upper corners of the door frame, a pair of lower protective side caps each mounted to the door assembly at one of lowermost edges of the door frame and a pair of support spacers each mounted to one of the lowermost edges of the door frame for elevating a bottom edge of the door slab above the ground to a distance compatible with a forklift, pallet jack or hand truck. The method further comprises the steps of stacking the plurality of the single unit protective door packages, aligning the stacked plurality of single unit protective door packages, and securing the stacked plurality of single unit protective door packages by top and bottom tightening straps encircling the stacked plurality of the single unit protective door packages over the upper and lower protective side caps, respectively.

Other aspects of the invention, including system, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1A:
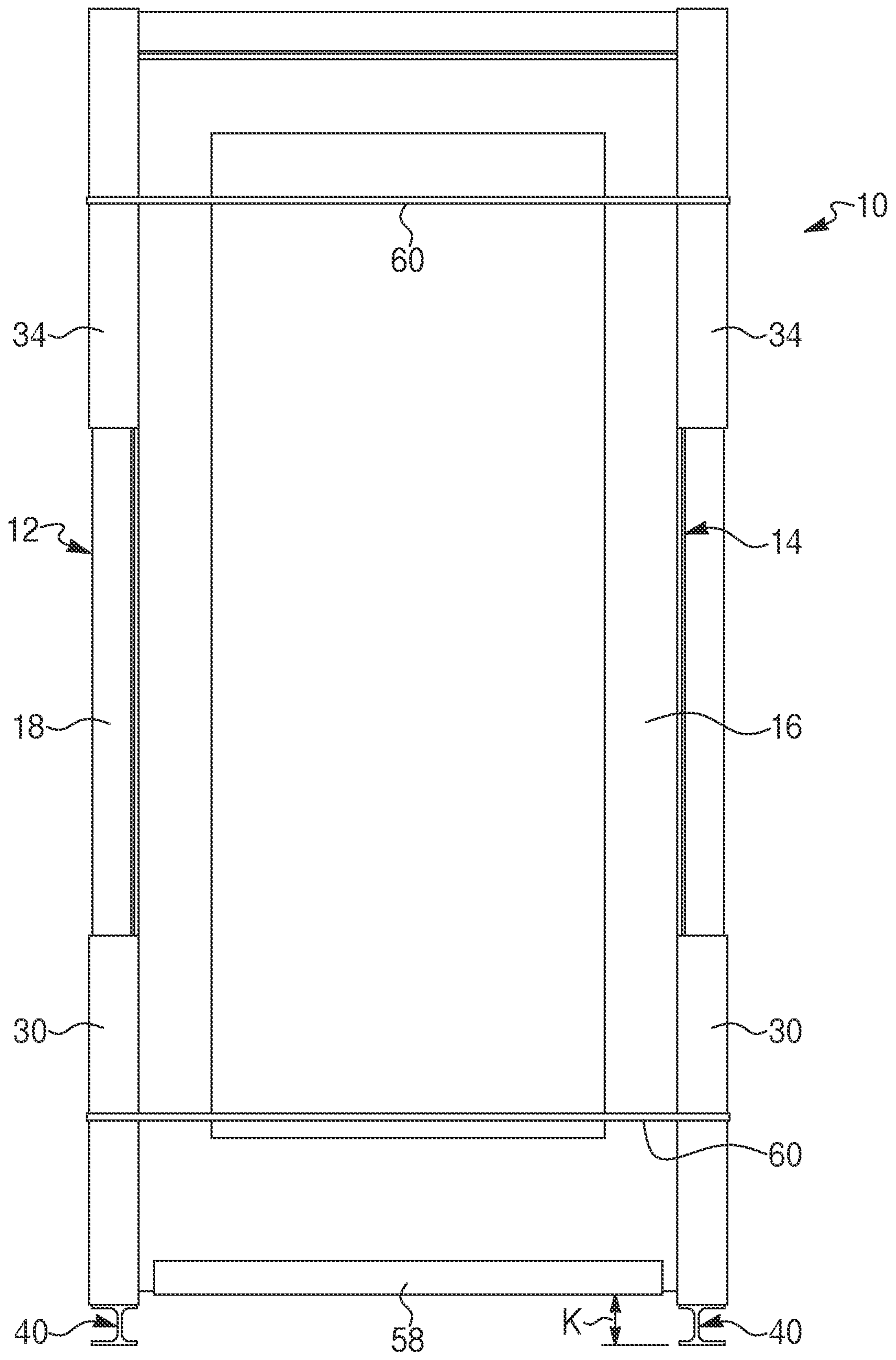
FIG. 1A is a front view of a single unit protective door package of a single prehung door assembly according to a first exemplary embodiment of the present invention.
Figure 1B:
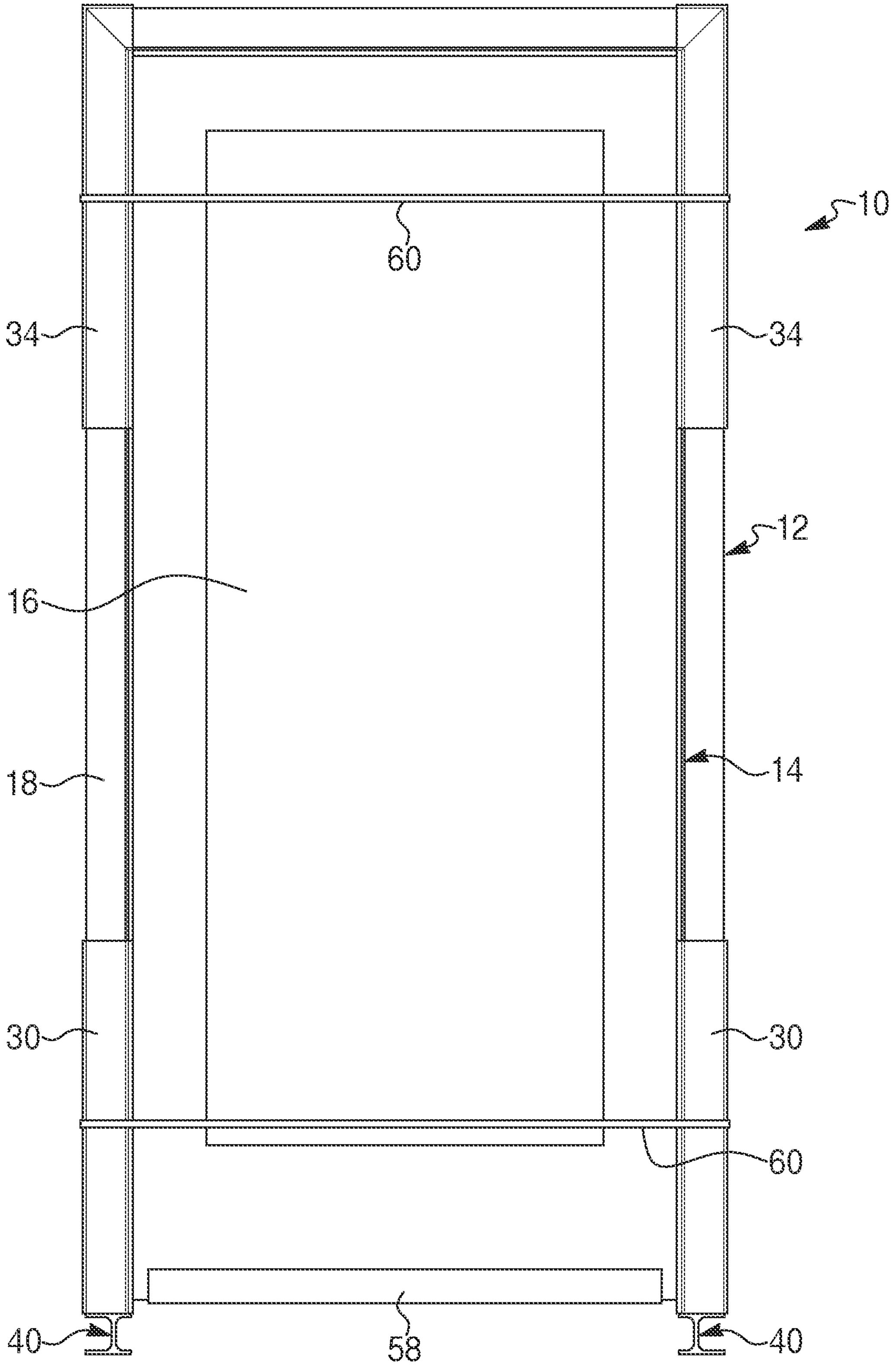
FIG. 1B is a front view of the protective door package shown partially in phantom lines.
Figure 2A:
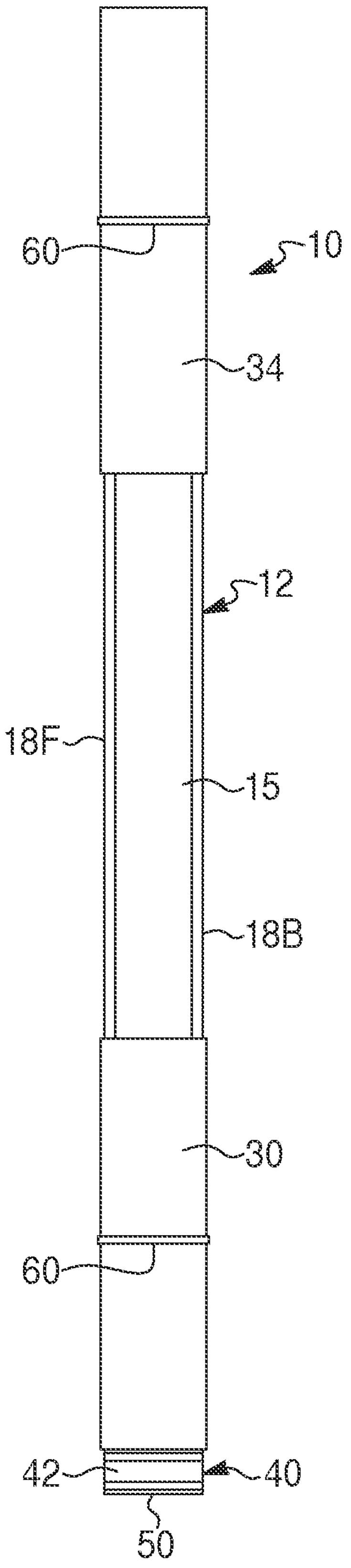
FIG. 2A is a side view of the protective door package.
Figure 2B:
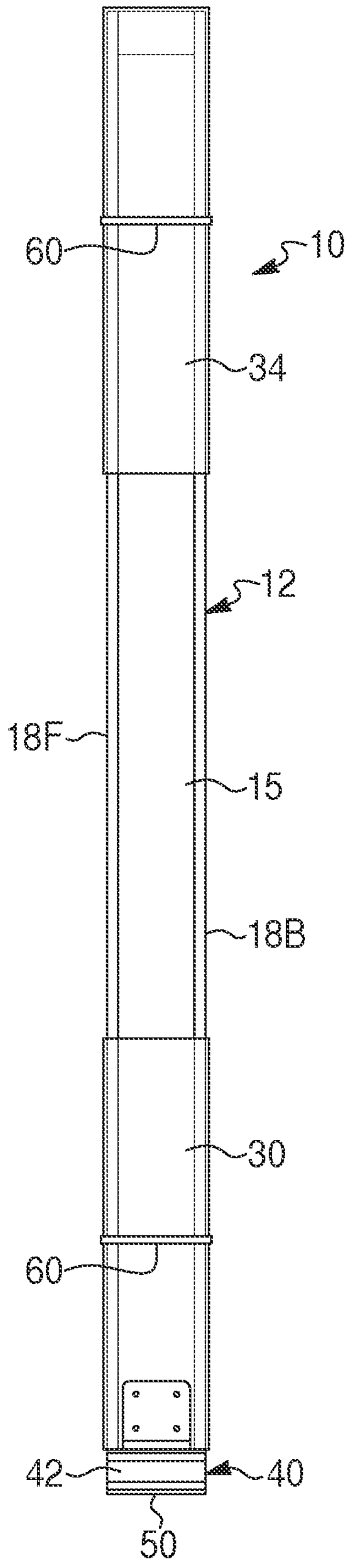
FIG. 2B is a side view of the protective door shown partially in phantom lines.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 4A:
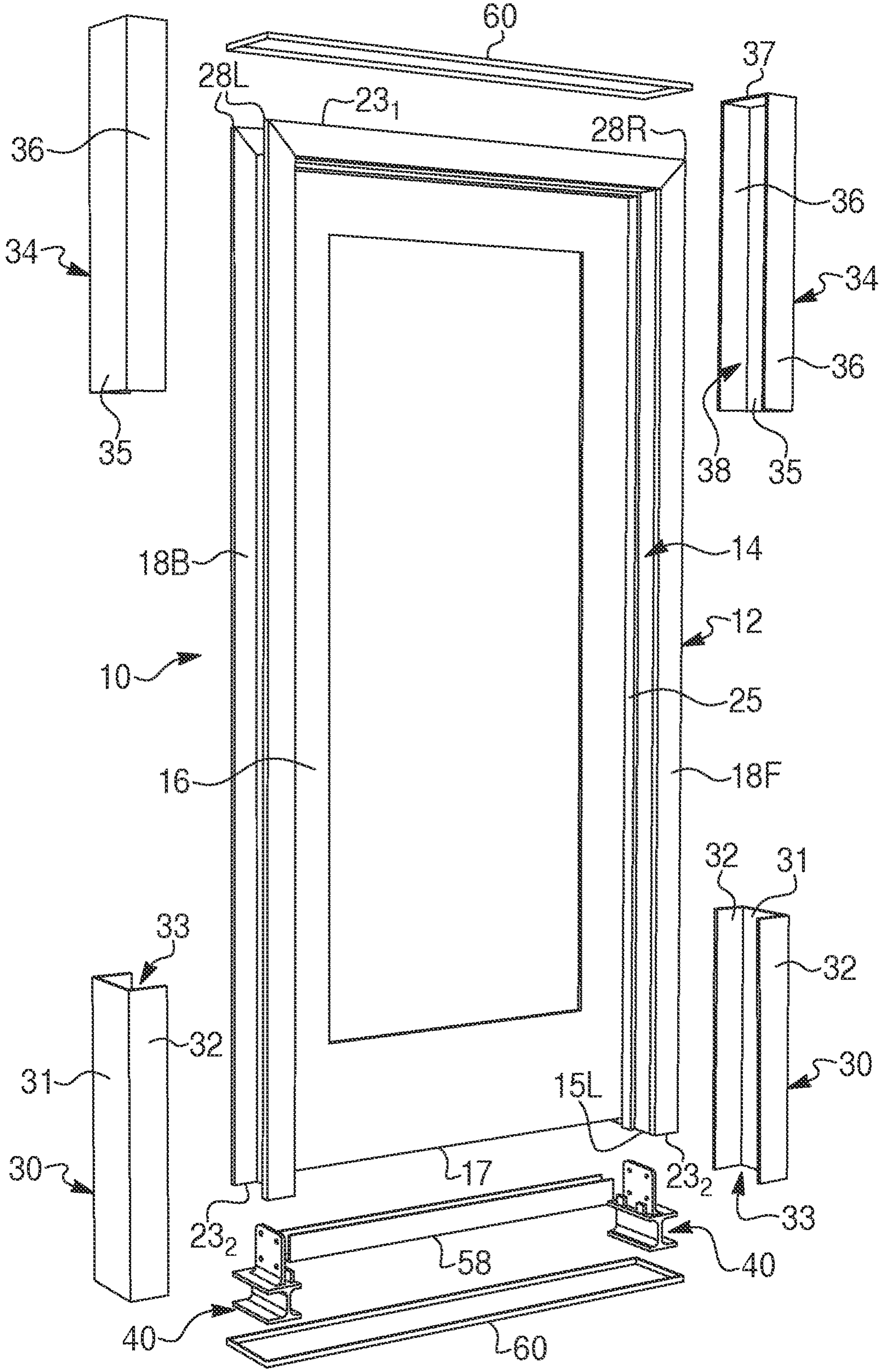
FIG. 4A is an exploded perspective view of the protective door package.
Figure 4B:
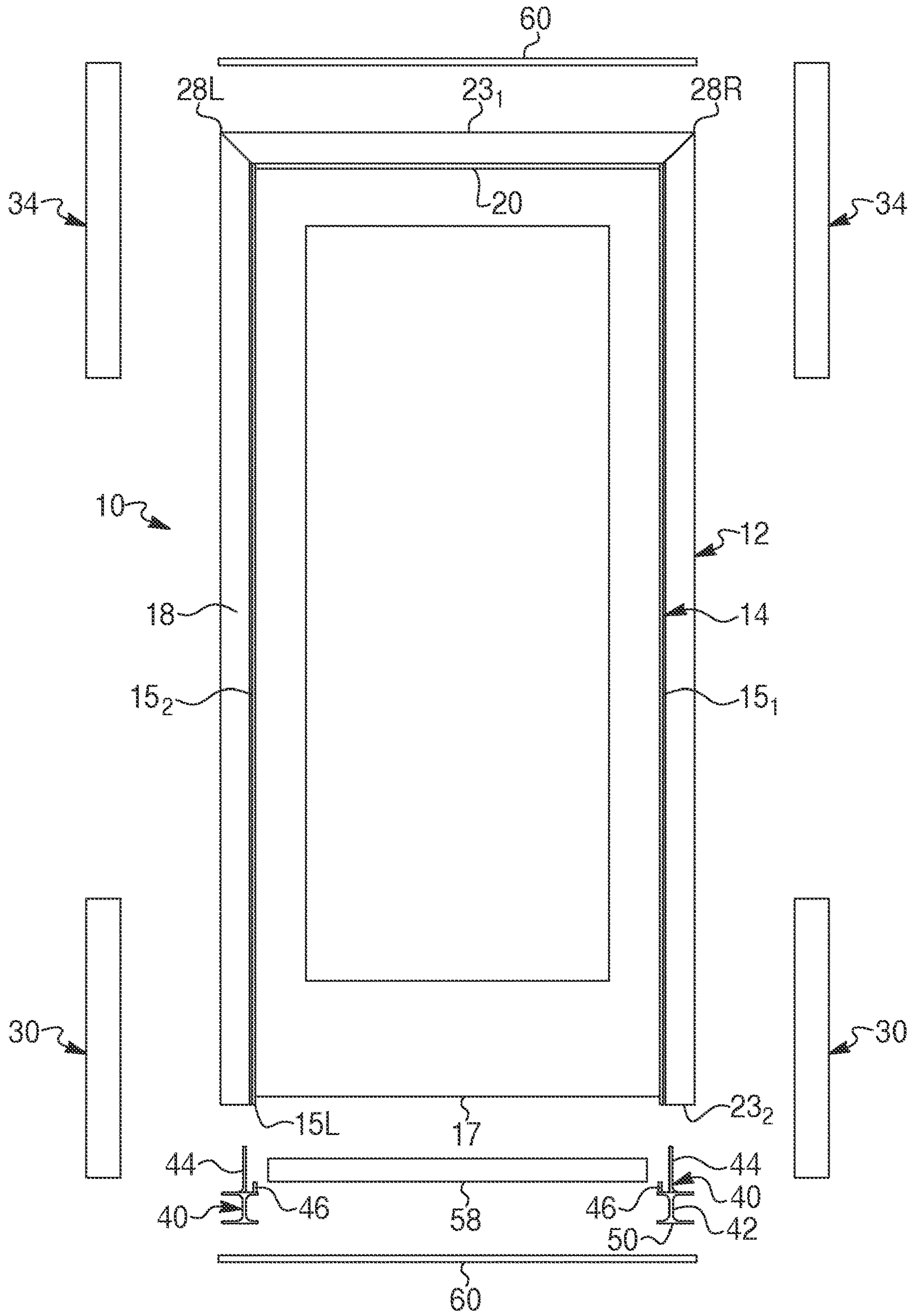
FIG. 4B is an exploded front elevation view of the protective door package.
Figure 5:
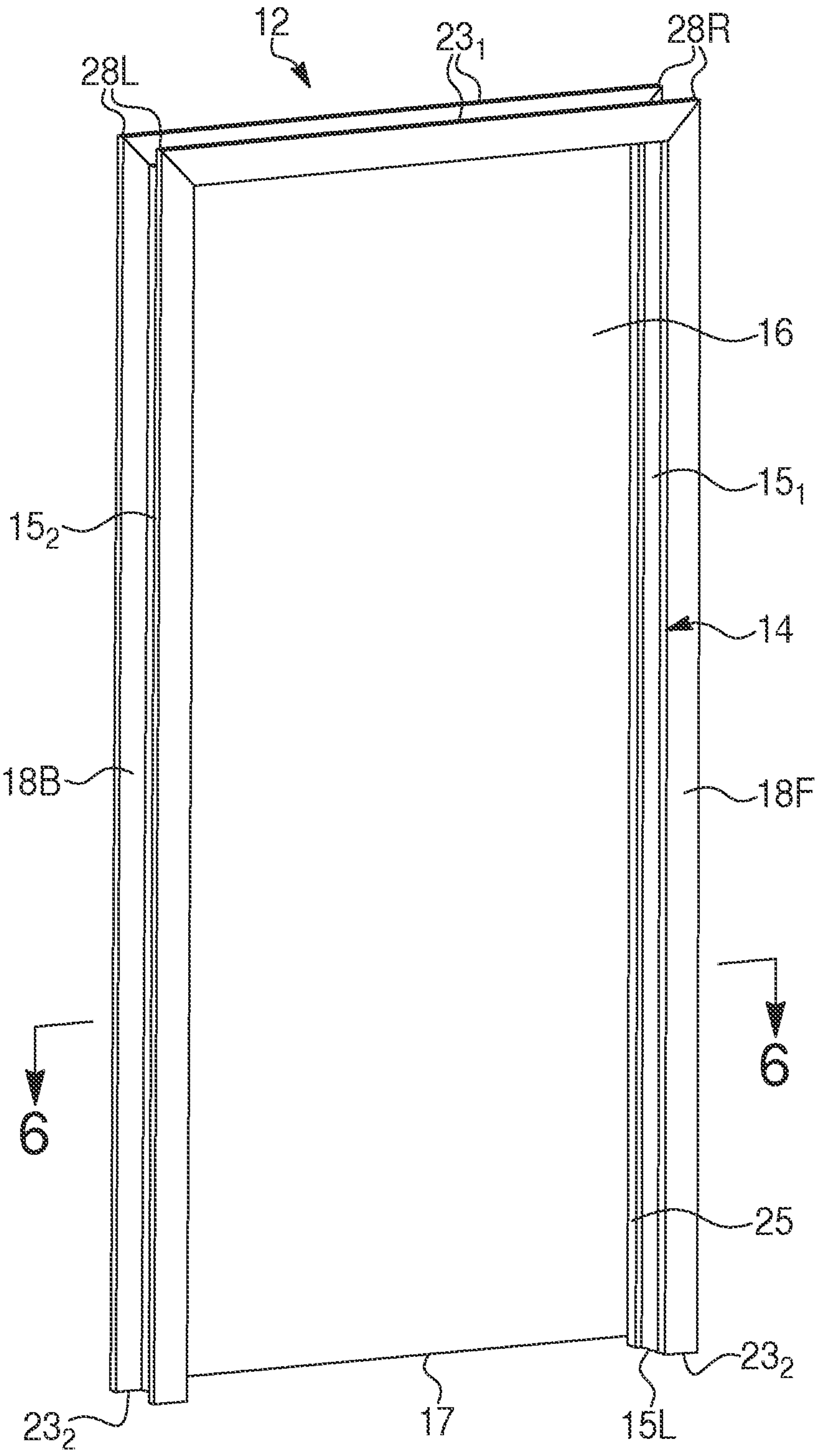
FIG. 5 is a perspective view of a single prehung door assembly.
Figure 6:
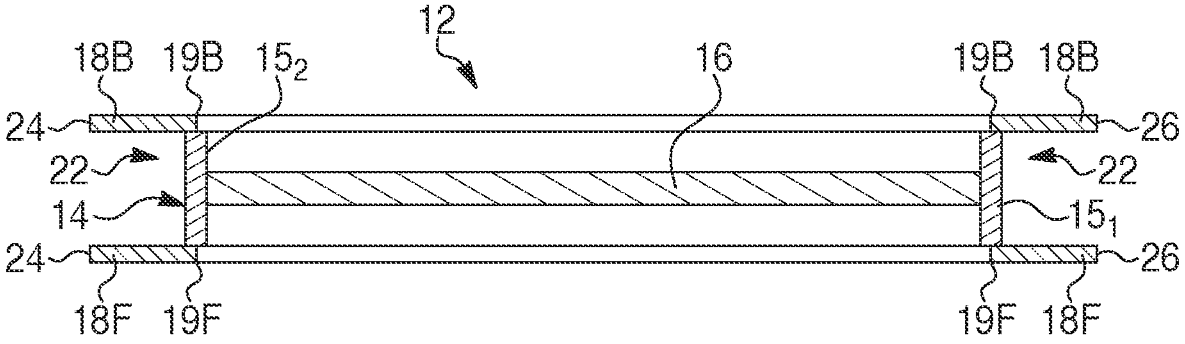
FIG. 6 is a cross-sectional view of the single prehung door assembly taken along the line 6-6 of FIG. 5.

FIGS. 1A-9 illustrate a single unit protective door package 10 for packaging of a single prehung door assembly 12 according to a first exemplary embodiment of the present invention. The prehung door assembly 12, as best shown in FIG. 5, is a conventional hinged residential door assembly, such as an interior or exterior door assembly, but it should be understood that the door assembly 12 may be a pivotally mounted exterior or interior door assembly provided for a residential or commercial building, such as a home, apartment, garage, condominium, hotel, office building, or the like. The prehung door assembly 12 may be a split jamb unit (i.e., door assembly), a flat jamb unit, an exterior frame unit, or a steel frame unit. The prehung door assembly 12 comprises a substantially rectangular door frame 14, and a door slab 16 pivotally attached to the door frame 14 by at least one hinge (although typically two or more hinges are utilized), such as a "butt hinge" that includes two leaves. The door slab 16 has a bottom edge 17. Typically, a door slab 16 is pre-cut for a doorknob and a strike plate. The prehung door assembly 12 may be made of any appropriate material, such as wood, metal, wood composite material, fiberglass reinforced polymer composite or the like.

The door frame 14 includes a first (or right) vertically extending side jamb $\mathbf{15}_1$, a second (or left) vertically extending side jamb $\mathbf{15}_2$, which is parallel to and spaced from the first side jamb $\mathbf{15}_1$, and a horizontally extending head jamb or header 20 that connects upper ends of the first and second side jambs $\mathbf{15}_1$ and $\mathbf{15}_2$. Lower ends of the first and second side jambs $\mathbf{15}_1$ and $\mathbf{15}_2$ typically are interconnected by a threshold (not shown). In the interest of simplicity, the following discussion will sometimes use a reference numeral 15 without a subscript numeral to designate one or both of the first and second vertically extending side jambs $\mathbf{15}_1$, $\mathbf{15}_2$. The door frame 14 (i.e., each of the first and second side jambs $\mathbf{15}_1$ and $\mathbf{15}_2$ of the door frame 14) has two opposite lowermost edges 15L.

The prehung door assembly 12 according to the present invention further comprises opposite front and back (or first and second) moldings (or trims) 18F and 18B, respectively, each connected to the door frame 14 along one of the side jambs 15. Specifically, the front moldings 18F are connected to front edges 19F of the door frame 14, while the back moldings 18B are connected to back edges 19B of the door frame 14. Each of the front and back moldings 18F and 18B has an uppermost edge $\mathbf{23}_1$ and a lowermost edge $\mathbf{23}_2$. As best shown in FIGS. 4A, 4B and 5, the lowermost edges $\mathbf{23}_2$ of the front and back moldings 18F, 18B coincide (or match, correspond, are coplanar) with the lowermost edge 15L of the door frame 14.

Moreover, each of the front and back moldings 18F and 18B have opposite right and left (or first and second) outer side edges 24 and 26, respectively. The front and back moldings 18F, 18B define a door frame channel 22 therebetween. In the interest of simplicity, the following discussion will sometimes use a reference numeral 18 without a subscript numeral to designate one or both of the front and back moldings 18F and 18B.

Figure 3A:
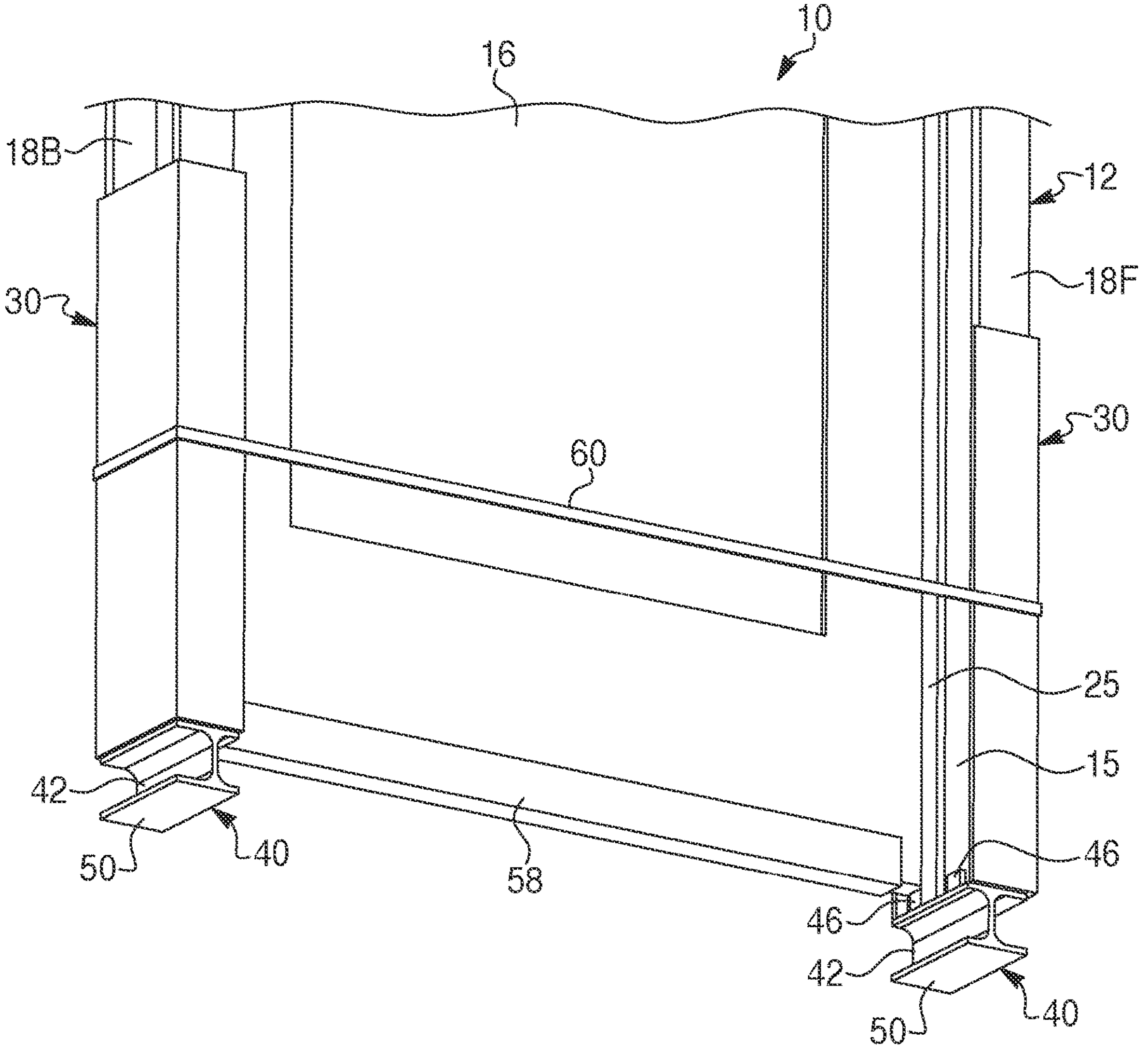
FIG. 3A is a fragmentary perspective view of a lower portion of the protective door package.
Figure 3B:
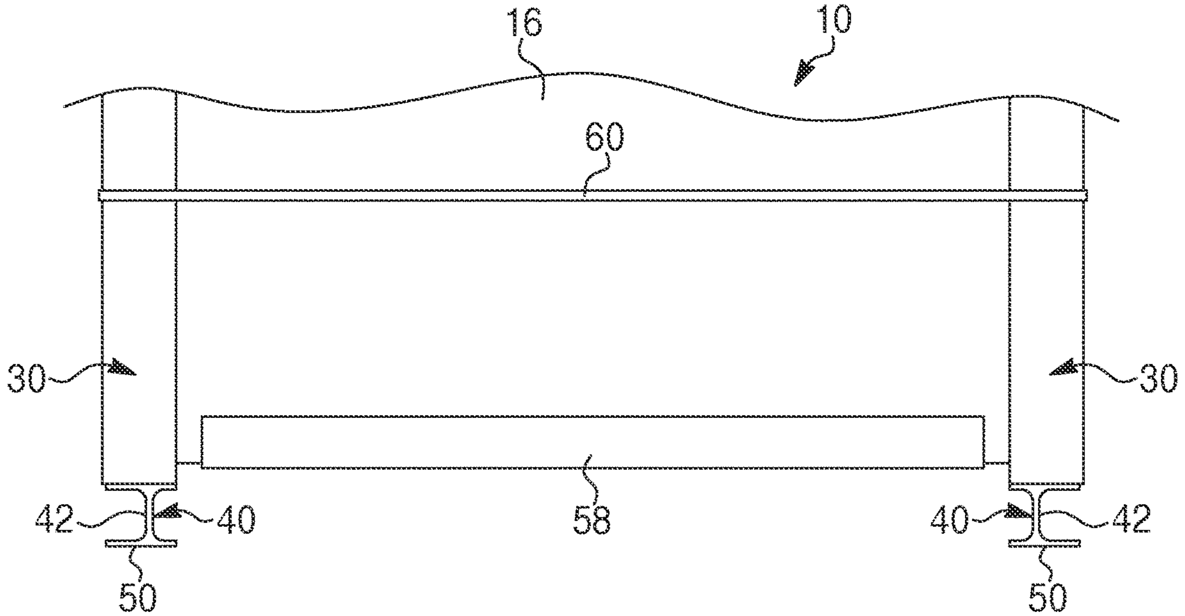
FIG. 3B is a fragmentary front view of the lower portion of the protective door package.
Figure 3C:
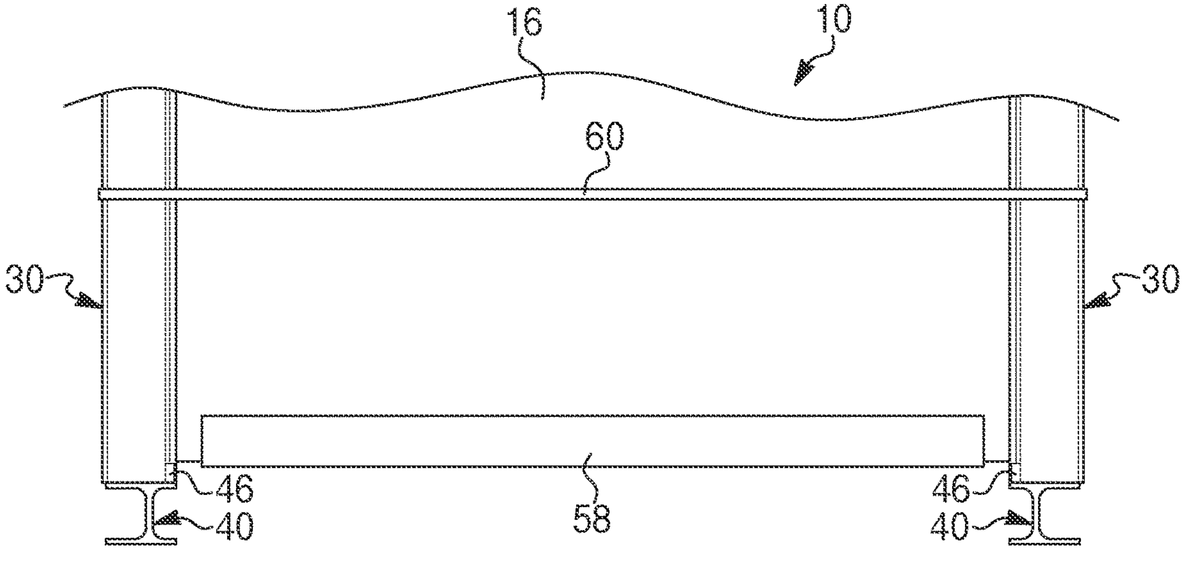
FIG. 3C is a fragmentary front view of the protective door package shown partially in phantom lines.

The door frame 14 has opposite right and left upper corners 28R and 28L, respectively, defined by the front and back moldings 18F and 18B. The right upper corner 28R of the door frame 14 is defined by the first side jamb $\mathbf{15}_1$ and the header jamb or header 20, as well as by the uppermost edges $\mathbf{23}_1$ and the right outer side edges 26 of each of the front and back moldings 18F and 18B. Correspondingly, the left and right lower corners of the door frame 14 are defined by the lowermost edge 15L of the first and second side jambs $\mathbf{15}_1$ and $\mathbf{15}_2$ of the door frame 14, as well as by the lowermost edges $\mathbf{23}_2$ of each of the front and back moldings 18F and 18B. A conventional door stop member 25 is fixed on an interior surface of at least one of the side jambs 15 of the door frame 14, as best shown in FIGS. 3A, 4A and 5, for limiting the movement of the door slab 16 by contacting the door slab 16 in a closed position.

The single unit protective door package 10 of the first exemplary embodiment comprises the single prehung door assembly 12, a pair of lower protective side caps 30 configured to be mounted at the lowermost edges $\mathbf{23}_2$ of the front and back moldings 18F, 18B and the lowermost edge 15L of the door frame 14, and a pair of structurally and geometrically identical upper protective side caps 34 configured to be mounted adjacent the uppermost edge $\mathbf{23}_1$ of the front and back moldings 18F, 18B. As best shown in FIGS. 1A-3C, each of the upper protective side caps 34 is mounted to the door assembly at one of opposite upper corners 28R and 28L of the door frame 14.

As best shown in FIG. 4A, each of the lower protective side caps 30 includes a base panel 31 and two side panels 32 forming therebetween a rectangular U-shaped open channel 33. The lower protective side caps 30 are preferably formed from a corrugated cardboard blank or like material. It will be appreciated that other materials may be used for manufacturing the lower protective side caps 30, such as corrugated plastic, extruded plastic, and the like. Each of the upper protective side caps 34 includes a base panel 35, two side panels 36 and an end panel 37 together forming therebetween a rectangular U-shaped open cavity 38. Unlike the open channel 33 of the lower protective side cap 30, the cavity 38 is closed at one end by the end panel 37, as best shown in FIG. 4A. Like the lower protective side caps 30, the upper protective side caps 34 are preferably formed from a corrugated cardboard blank. It will be appreciated that other materials may be used for manufacturing the upper protective side caps 34.

The lower protective side caps 30 are mounted to the door frame 14 of the door assembly 12 at the lowermost edge $\mathbf{23}_2$ of the front and back moldings 18F and 18B, so that the front and back moldings 18F and 18B are disposed in the open channel 33 of the lower protective side caps 30. Moreover, when mounted to the door frame 14, the base panel 32 engages the outer side edges 24 and 26 of the front and back moldings 18F and 18B. The upper protective side caps 34 are mounted to the door frame 14 of the door assembly 12 at the uppermost edge $23_1$ of the front and back moldings 18F and 18B, so that the front and back moldings 18F and 18B are disposed in the open cavity 38 of the upper protective side caps 34. Moreover, when mounted to the door frame 14, the base panel 35 engages the outer side edges 24 and 26 of the front and back moldings 18F and 18B, while the end panel 37 engages the uppermost edges $23_1$ of the front and back moldings 18F, 18B. The protective side caps 32, 34, respectively, thus surround and protect the moldings 18F and 18B.

The single unit protective door package 10 further comprises a pair of support spacers 40 (best shown in FIG. 7) mounted to the door frame 14. Support spacers 40 are preferably structurally and geometrically identical. Support spacers 40 extend away from the lowermost edge $23_2$ of the front and back moldings 18F, 18B and from the lowermost edge 15L of the door frame 14, as best shown in FIGS. 1A-3C, and 7. Each of the support spacers 40 includes an I-shaped base member 42, a planar connecting member 44 and at least one, preferably two according to the first exemplary embodiment, planar support members 46 spaced from the connecting member 44 a distance equal to or slightly larger than the thickness of the door slab 16. Moreover, the two support members 46 are spaced from one another a distance equal to or slightly larger than the width of the door stop 25 the door slab 16, i.e., sufficient to receive the door stop member 25 therebetween. In other words, the door stop member 25 is configured to dispose between the two support members 46, as best shown in FIG. 3A.

Figure 7:
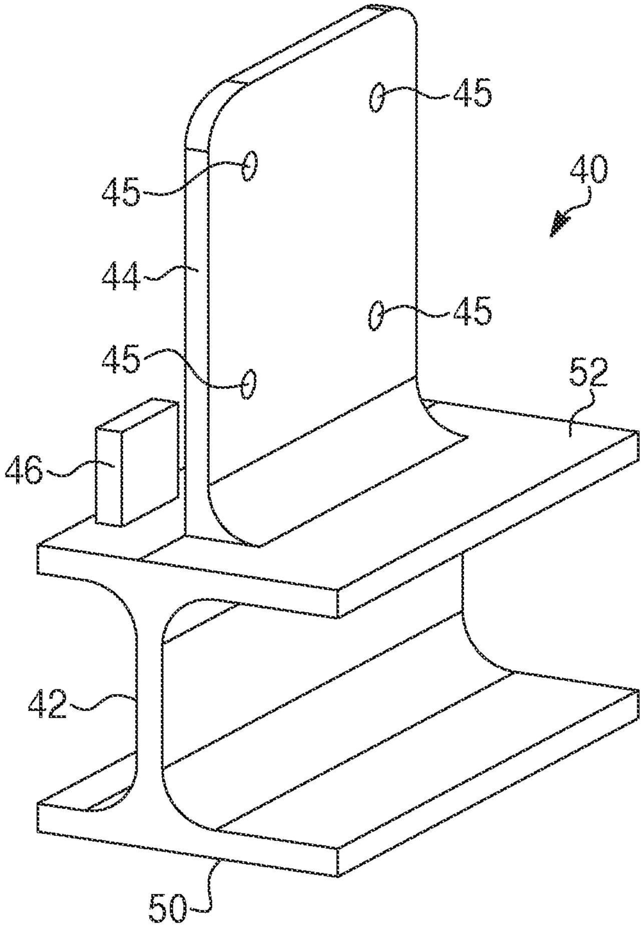
FIG. 7 is a perspective view of a support spacer according to the first exemplary embodiment of the present invention.

Each of the support spacers 40 is formed as an integral part, such as through injection molding of a polymer material. Alternatively, other materials and manufacturing processes may be used. In turn, the base member 42 has a planar (i.e., flat) bottom surface 50 adapted to engage a floor surface, and a planar top surface 52 parallel to the planar bottom surface 50, as best shown in FIG. 7. Both the connecting member 44 and the support members 46 extend outwardly from the top surface 52 perpendicularly thereto. The connecting member 44 of each of the support spacers 40 according to the first exemplary embodiment has one or more (such as four, as illustrated in FIG. 7) connecting holes 45 formed therethrough for securing (such as non-moveably securing or fastening) the support spacers 40 to the side jambs 15 by fasteners (such as screws or nails) extending through the connecting holes 45. Alternatively, the support spacers 40 may be secured to the door frame 14 of the prehung door assembly 12 with or without fasteners.

The support spacers 40 are configured to elevate the prehung door assembly 12 above the floor (off the ground) to a distance k (best shown in FIG. 1A) for compatibility with a 3.5" forklift, pallet jack or hand truck. Of course, other distances k may be utilized.

The single unit protective door package 10 further comprises a door base protector 58 mounted to the bottom edge 17 of the door slab 16, and at least two (bottom and top) packaging (or tightening) straps 60 each securing one of the lower and upper protective side caps 30, 34 to the prehung door assembly 12, as best shown in FIGS. 1A-2B. As best shown in FIGS. 1A-2B, the bottom and top tightening straps 60 encircle the prehung door assembly 12, preferably about the lower and upper protective side caps 30, 34, respectively, thus forming the single unit protective door package 10. The tightening straps 60 are made of polyester, nylon or other flexible materials. The protective straps 60 engage the protective side caps 30, 34, and thus minimize any damage to the moldings 18F, B.

A method of packaging the prehung door assembly 12 into the single unit protective door package 10 of the first exemplary embodiment follows.

First, a support spacer 40 is mounted to each of the first and second side jambs $15_1$ and $15_2$ of the door frame 14 so as to extend away from the lowermost edge $23_2$ of the front and back moldings 18F, 18B and from the lowermost edge 15L of the door frame 14, as best shown in FIGS. 1A-3C. Accordingly, the connecting members 44 are positioned between the front and back moldings 18F, 18B so that the support members 46 and the connecting members 44 of the support spacers 40 engage the side jambs 15 therebetween, as best shown in FIGS. 3A, 4A and 4B. The planar top surface 52 of each of the support spacers 40 engages the lowermost edge 15L of the door frame 14 and the lowermost edge $23_2$ of the front and back moldings 18F and 18B. In addition, the support spacers 40 may be secured to the side jambs 15 by fasteners (such as screws or nails) extending through the connecting holes 45 through the support members 46.

Next, the lower protective side caps 30 are placed onto the prehung door assembly 12. As best shown in FIG. 1A-3C, the lower protective side caps 30 are positioned about the prehung door assembly 12 adjacent to the lowermost edges 15L of the door frame 14 and the lowermost edges $23_2$ of the front and back moldings 18F and 18B. When in position about the door assembly 12, the base panel 32 of each of the lower protective side caps 30 engages the outer side edges 24, 26 of the front and back moldings 18F, 18B and covers the door frame channel 22 between the moldings 18. The side panels 32 of the lower protective side caps 30 engage outer surfaces of the front and back moldings 18 so that the front and back moldings 18F, 18B are positioned in the rectangular U-shaped open channels 33 of the lower protective side caps 30 between the two side panels 32. Moreover, each of the lower protective side caps 30 engages the planar top surface 52 of one of the support spacers 40.

Then, the lower protective side caps 30 are secured in position about the prehung door assembly 12 by one of the tightening straps 60. Those skilled in the art recognize that the straps 6 are sufficiently tightened about the door assembly 12 to retain the side caps 30 in position. Also, the door base protector 58 is mounted to the bottom edge 17 of the door slab 16, such as through friction or by using a pressure sensitive adhesive or adhesive tape. Thus, the lower protective side caps 30, when secured in position about the door assembly 12 by the tightening strap 60, cover and offer a degree of protection to the front and back moldings 18F, 18B in the corner regions of the door assembly 12.

Next, the upper protective side caps 34 are placed onto the prehung door assembly 12. As best shown in FIG. 1A-2B, the upper protective side caps 34 are positioned about the prehung door assembly 12 adjacent to the uppermost edge $23_1$ of the front and back moldings 18F, 18B of the door assembly 12. When in position about the door assembly 12, the base panel 35 and the end panel 37 of each of the upper protective side caps 34 engage the outer side edges 24, 26 of the front and back moldings 18F, 18B and cover the door frame channel 22 between the moldings 18. The side panels 36 of the upper protective side caps 34 engage outer surfaces of the front and back moldings 18F, 18B so that the front and back moldings 18F, 18B are disposed in the rectangular U-shaped open cavity 38 between the two side panels 36.

Then, the upper protective side caps 34 are secured in position about the prehung door assembly 12 by another tightening strap 60. As with the lower protective side caps 30, the strap 60 is sufficiently tightened to retain the protective side caps 34 in position to protect the moldings 18F, B. Thus, the upper protective side caps 34, when secured in position about the door assembly 12 by the tightening straps 60, cover and offer a degree of protection to the front and back moldings 18F, 18B in the corner regions of the door assembly 12.

Figure 8:
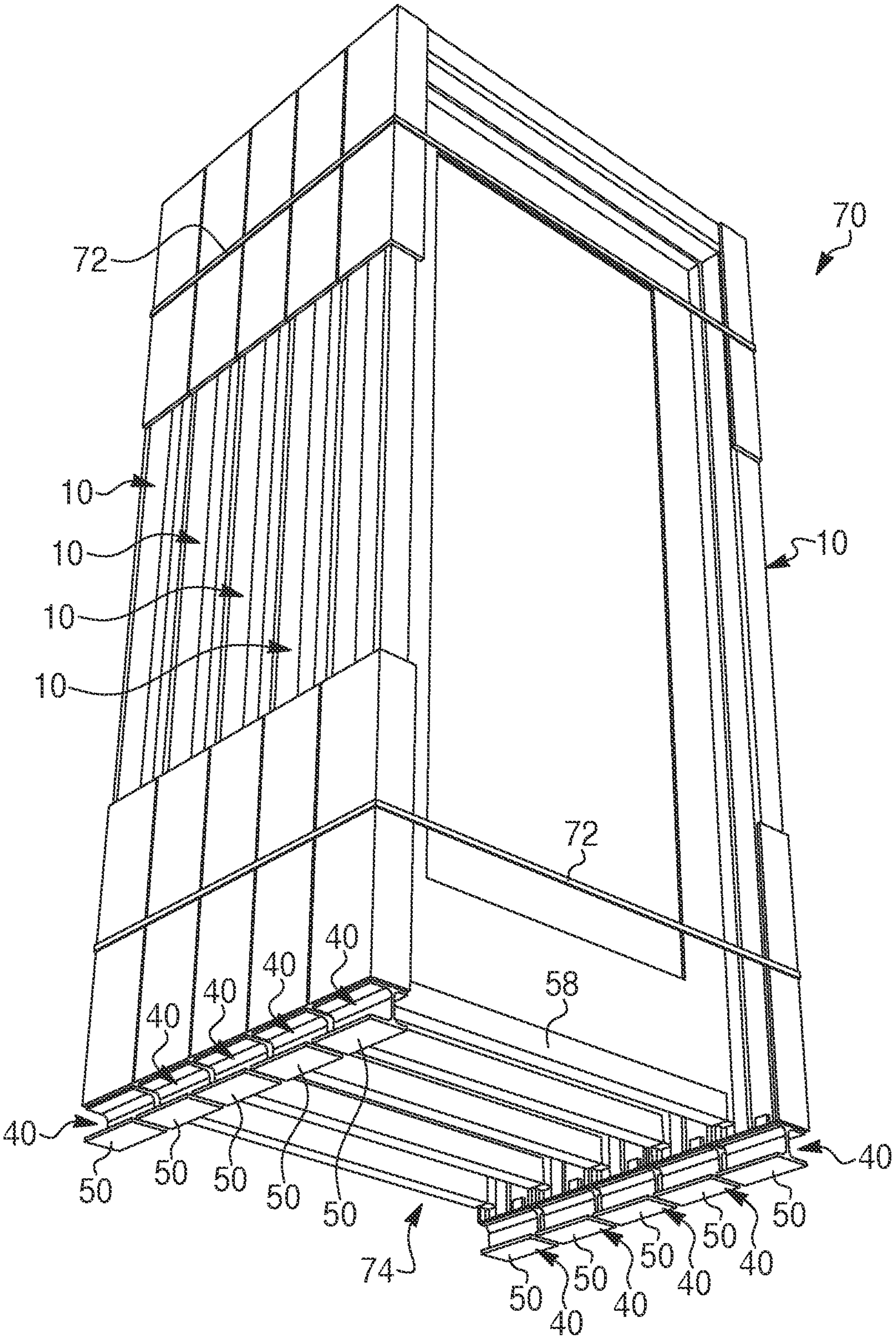
FIG. 8 is perspective view of unitized door packaging of the single unit protective door packages.
Figure 9:
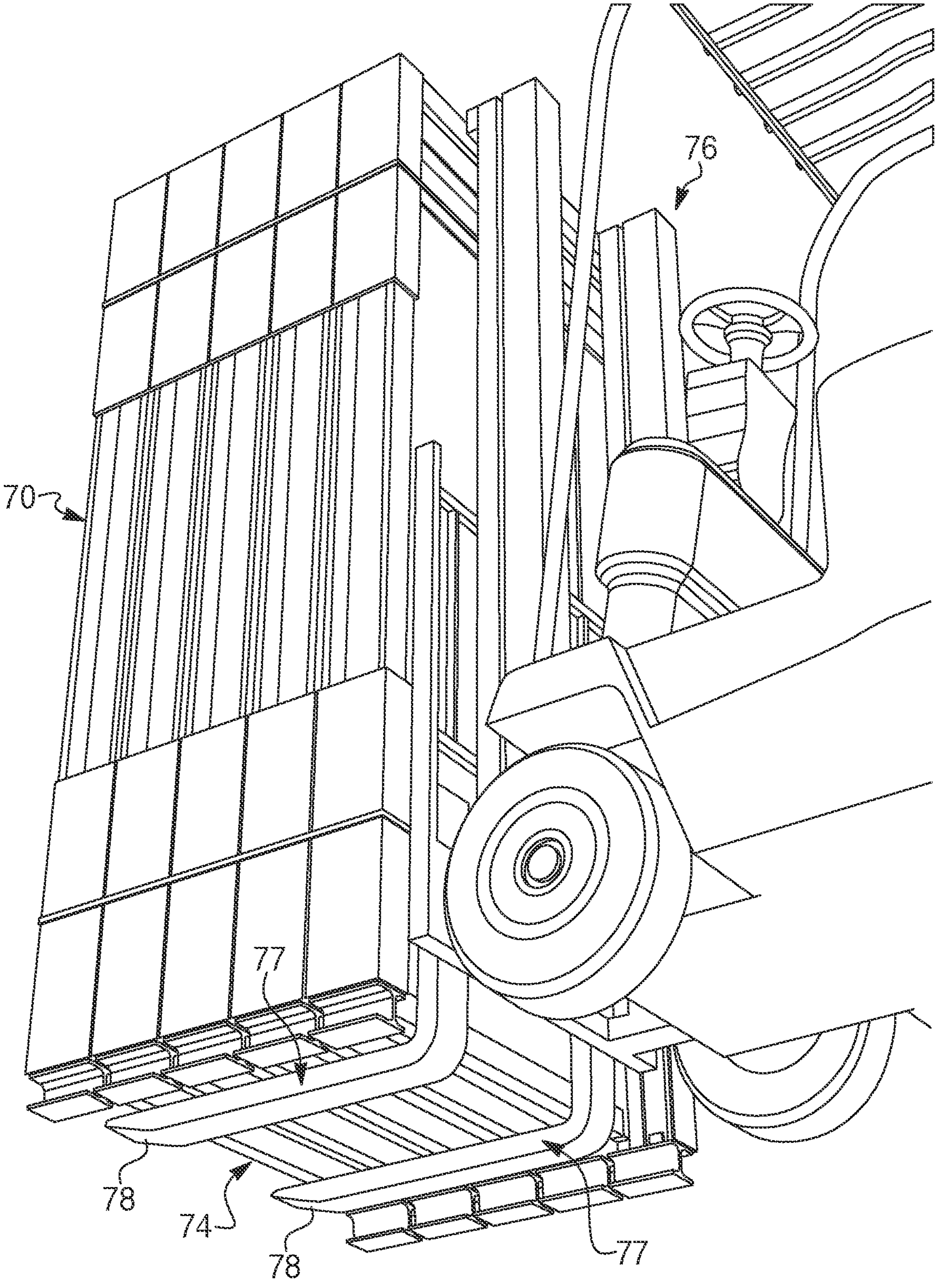
FIG. 9 is perspective view of the unitized door packaging engaged by a forklift.
Figure 10A:
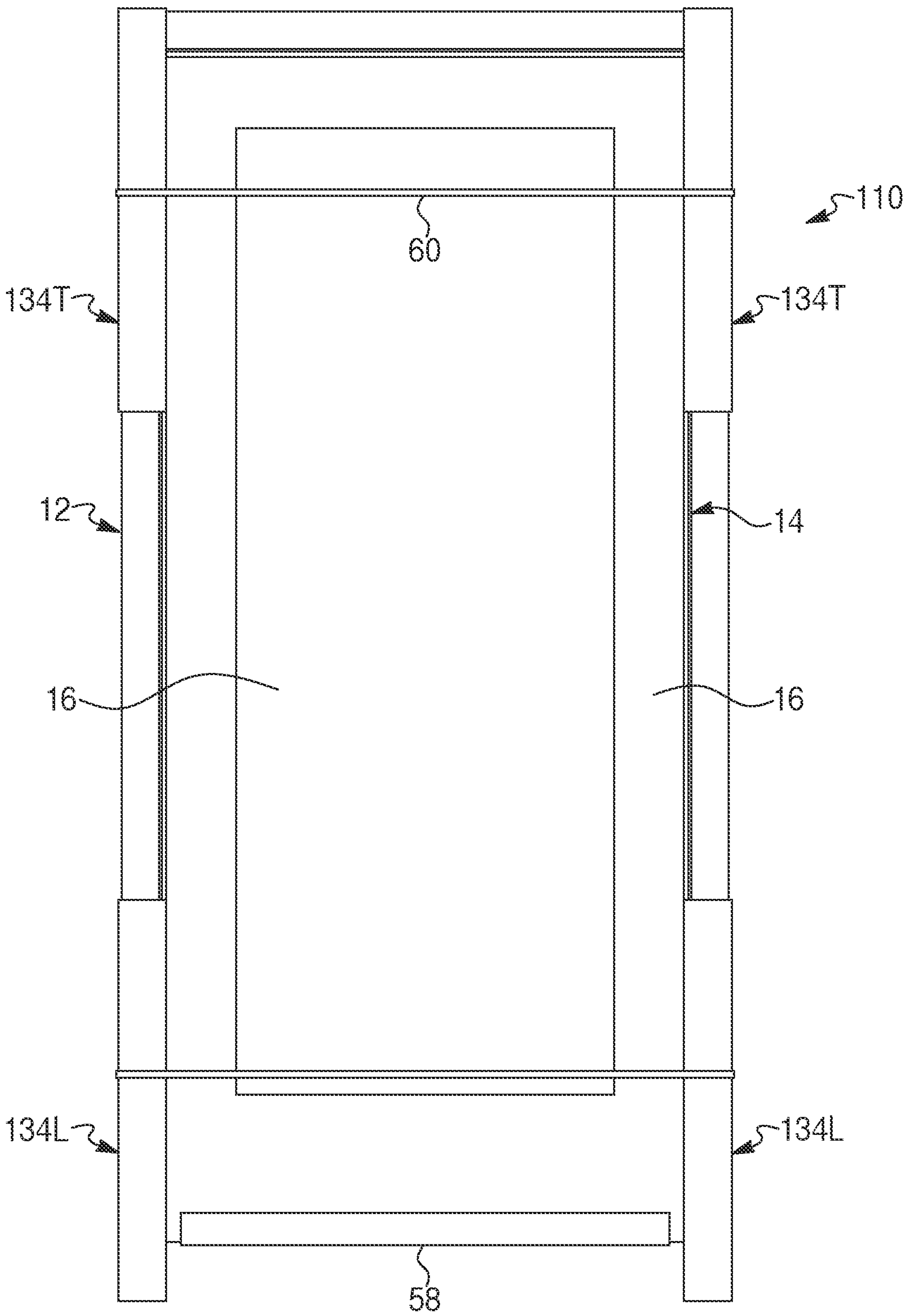
FIG. 10A is a front view of the single unit protective door package of the single prehung door assembly according to a second exemplary embodiment of the present invention.
Figure 10B:
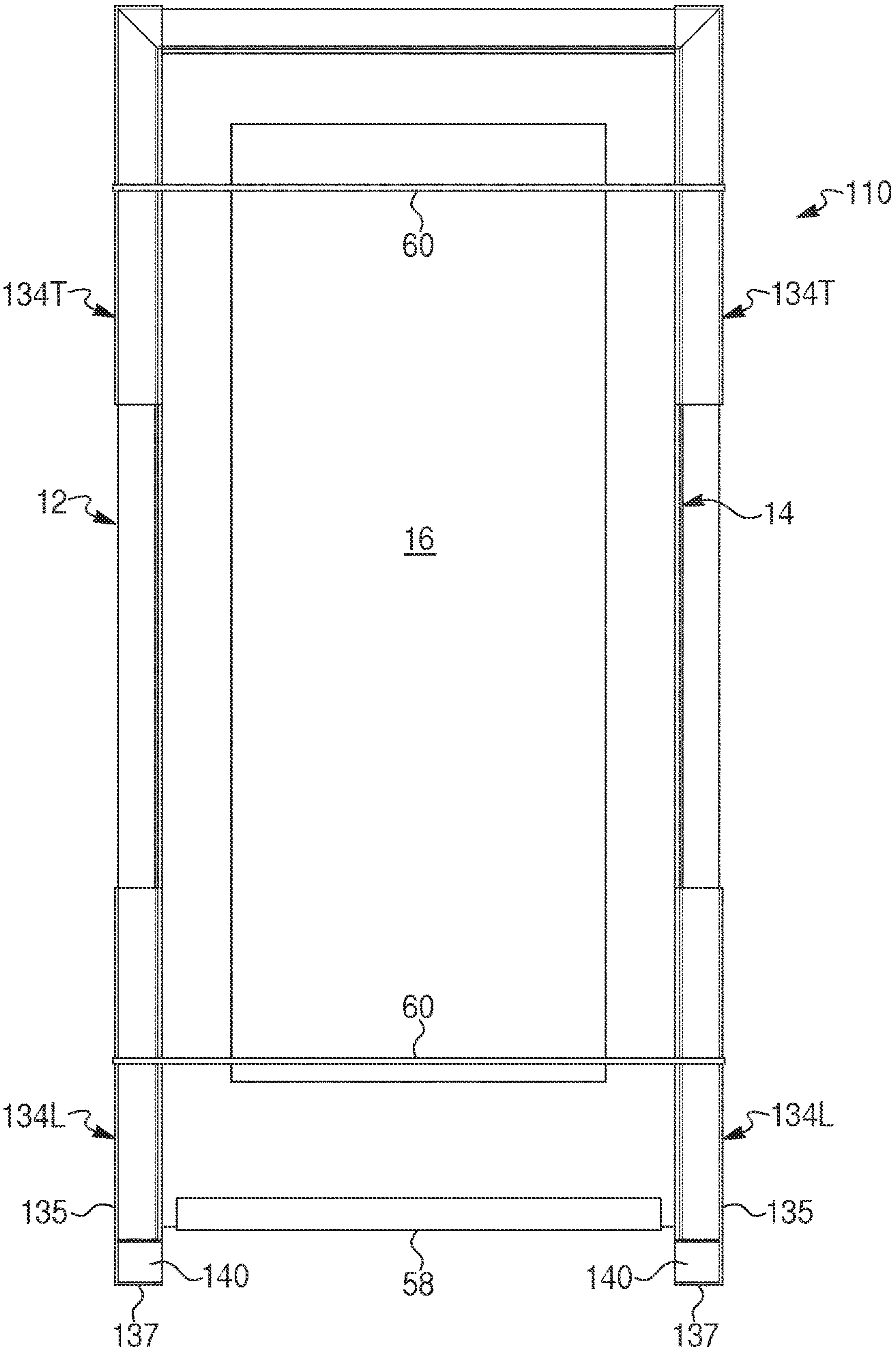
FIG. 10B is a front view of the protective door package according to the second exemplary embodiment shown partially in phantom lines.
Figure 11A:
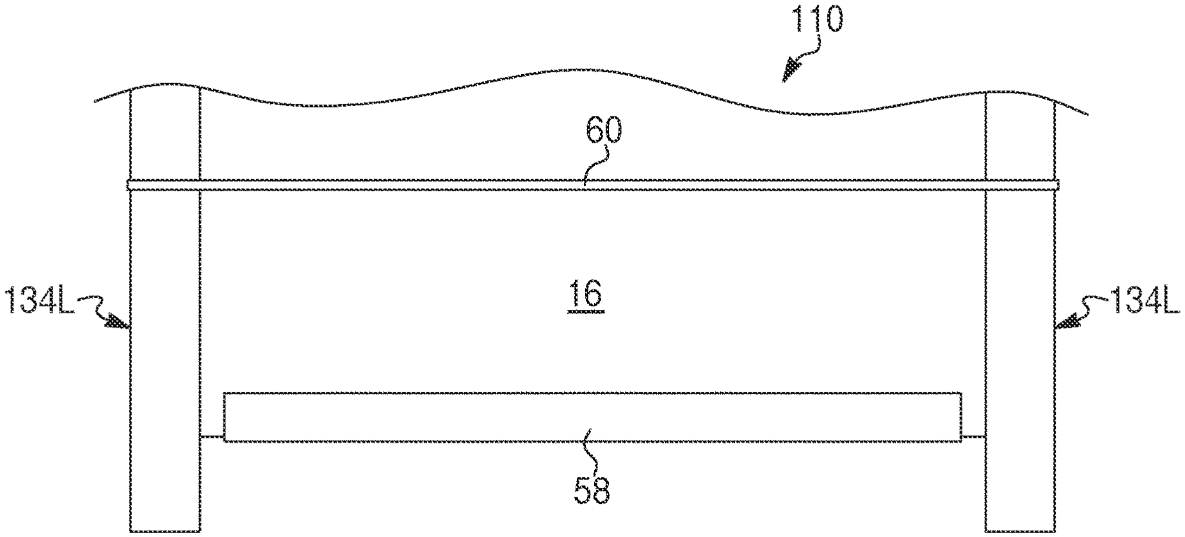
FIG. 11A is a fragmentary front view of a lower portion of the protective door package according to the second exemplary embodiment.
Figure 11B:
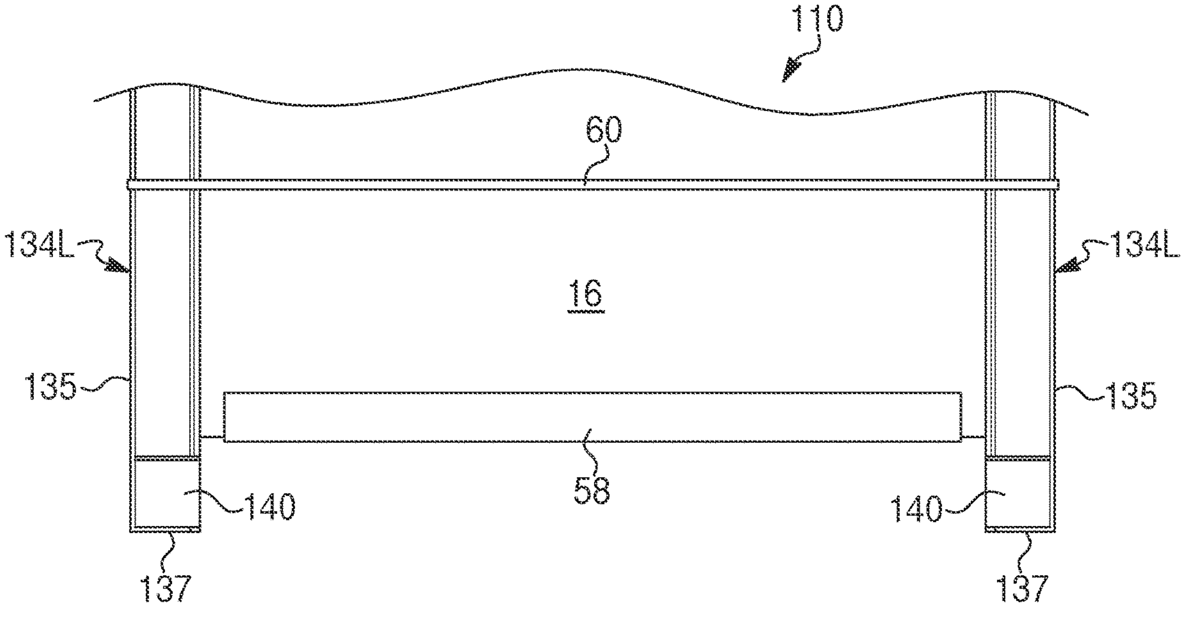
FIG. 11B is a fragmentary front view of the lower portion of the protective door package according to the second exemplary embodiment shown partially in phantom lines.

A plurality, such as five, of the single unit protective door packages 10 may be unitized to form a unitized door packaging 70, as illustrated in FIGS. 8 and 9. To assemble the unitized door packaging 70, the individual single unit protective door packages 10 are horizontally or vertically stacked, i.e., horizontally or vertically arranged next to and in contact with each other, as best shown in FIG. 8. While we illustrate the door packages 10 in a vertically stacked orientation in FIGS. 8-9, those skilled in the art will understand that a horizontal orientation may also be utilized. As illustrated in FIG. 8, the single unit protective door packages 10 are aligned (i.e., colinear) with each other, so that the bottom surfaces 50 of the support spacers 40 of the single unit protective door packages 10 are aligned and coplanar. The stacked single unit protective door packages 10 are secured in a stacked orientation by at least top and bottom tightening straps 72, as best shown in FIG. 8. The tightening straps 72 are similar to straps 60, although of a larger size and of sufficient strength to maintain the aligned door packages 10 in the assembled form during subsequent handling and transport.

The aligned and coplanar support spacers 40, located on opposite sides of the door packages 10, of the unitized door packaging 70 define a fork channel 74 therebetween configured to receive forwardly extending fork tines 78 of L-shaped forks 77 of a forklift vehicle 76 or of a pallet jack. The fork channel 74 thereby defines an opening such that the fork tines 78 of the forklift vehicle 76 or pallet jack can enter the fork channel 74 and support the unitized door packaging 70. Thus, a forklift vehicle 76 or pallet jack may be used to lift the unitized door packaging 70 when the fork tines 78 thereof extend into the fork channel 74 of the unitized door packaging 70, as best shown in FIG. 9, and then transport the unitized door packaging 70, such as for loading or unloading onto a truck or moved about a warehouse.

Various modifications, changes, and alterations may be practiced with the above-described embodiment, including but not limited to the additional embodiment shown in FIGS. 10A-13B. In the interest of brevity, reference characters in FIGS. 10A-13B that are discussed above in connection with FIGS. 1-9 are not further elaborated upon below, except to the extent necessary or useful to explain the additional embodiment of FIGS. 10A-13B. Modified components and parts are indicated by the addition of a hundred digits to the reference numerals of the components or parts.

A single unit protective door package 110 for a single prehung door assembly 12 according to a second exemplary embodiment is illustrated in FIGS. 10A-13B. The single unit protective door package 110 of FIGS. 10A-13B corresponds substantially to the single unit protective door package 10 of FIGS. 1-9, and only portions of the single unit protective door package 110 which differ will therefore be explained in detail below.

The single unit protective door package 110 comprises a pair of lower protective side caps 134L mounted adjacent the lowermost edges $\mathbf{23}_2$ of the front and back moldings 18F, 18B and the lowermost edge 15L of the door frame 14, as best shown in FIGS. 10A-12B. The protective door package 110 may further comprise a pair of upper protective side caps 134T mounted adjacent the uppermost edge $\mathbf{23}_1$ of the front and back moldings 18F, 18B, as best shown in FIGS. 10A, 10B, 12A and 12B. The lower protective side caps 134L and the upper protective side caps 134T are preferably structurally and geometrically identical to each other in the second exemplary embodiment. Moreover, the lower and upper protective side caps 134L, 134T are preferably structurally and geometrically identical to the upper protective side caps 34 of the first exemplary embodiment. In the interest of simplicity, the following discussion will sometimes use the reference numeral 134 without a character designating an entire group of substantially identical protective side caps. In other words, the reference numeral 134 will be used when generically referring to each of the lower and upper protective side caps 134L and 134T rather than reciting both reference numerals.

Figure 13A:
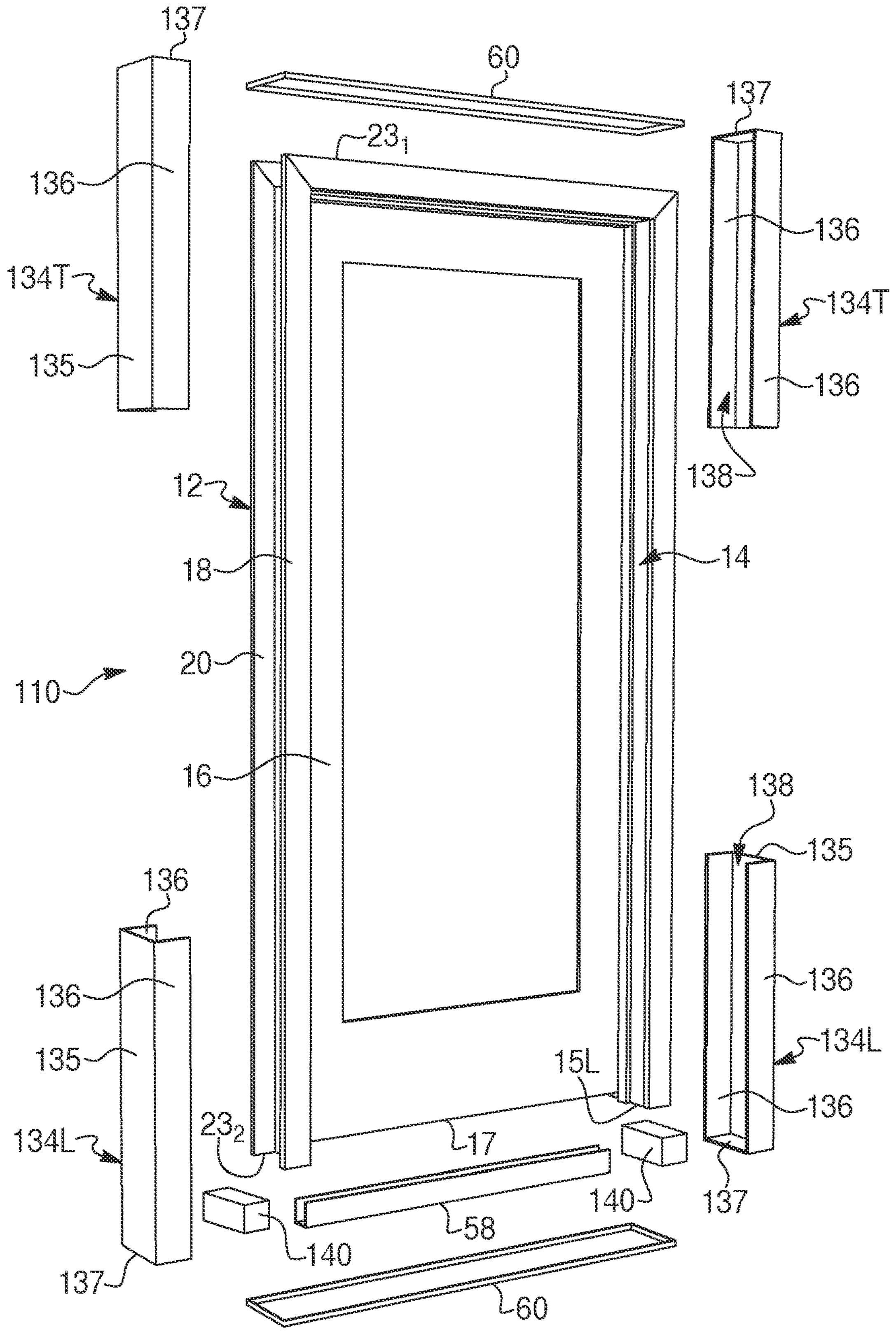
FIG. 13A is an exploded perspective view of the protective door package according to the second exemplary embodiment.

Each of the protective side caps 134 includes a base panel 135, two parallel side panels 136, and an end panel 137, together forming therebetween a rectangular U-shaped open cavity 138. Cavity 138 is closed at one end by the end panel 137, as best shown in FIG. 13A. As with the protective side caps 30 and 34 of the first exemplary embodiment, the protective side caps 134 are preferably formed from a corrugated cardboard material. It will be appreciated that other materials may be used for manufacturing the protective side caps 134.

The upper protective side caps 134T are mounted onto the door frame 14 of the door assembly 12 at the uppermost edges $\mathbf{23}_1$ of the front and back moldings 18F and 18B. Accordingly, the front and back moldings 18F and 18B are disposed in the open cavity 138 of the upper protective side caps 134T. Moreover, when mounted to the door frame 14, the base panel 135 engages the outer side edges 24 and 26 of the front and back moldings 18F and 18B, while the end panel 137 engages the uppermost edges $\mathbf{23}_1$ of the front and back moldings 18F, 18B. The lower protective side caps 134L are mounted to the door frame 14 of the door assembly 12 at the lowermost edges $\mathbf{23}_2$ of the front and back moldings 18F and 18B, so that the front and back moldings 18F and 18B are positioned in the open cavity 138 of the lower protective side caps 134L. Moreover, when mounted to the door frame 14, the base panel 135 of the lower protective side caps 134L engages the outer side edges 24 and 26 of the front and back moldings 18F and 18B, while the end panel 137 is spaced from the lowermost edges $\mathbf{23}_2$ of the front and back moldings 18F, 18B and from the lowermost edges 15L of the door frame 14.

The single unit protective door package 110 further comprises a pair of structurally and geometrically identical support spacers 140. The spacers 140 are mounted to the door frame 14 and extend away from the lowermost edges $\mathbf{23}_2$ of the front and back moldings 18F, 18B and from the lowermost edges 15L of the door frame 14, as best shown in FIGS. 10A, 10B, 12A and 12B. Each of the support spacers 140 is preferably in the form of a hexahedron, such as cube or rectangular cuboid, as best shown in FIGS. 13A and 13B. Each of the support spacers 140 is disposed in the lower protective side caps 134L so as to be in contact with the end panel 137. The support spacers 140 are made of corrugated cardboard, plastic material, foam, rubber, etc., that has been rolled, folded or otherwise formed into rectangular cuboid configuration. In that configuration, the corrugations are oriented vertically, and their collective orientation is sufficient to support door package 110.

A method of packaging the prehung door assembly 12 into the single unit protective door package 110 of the second exemplary embodiment follows.

Figure 12A:
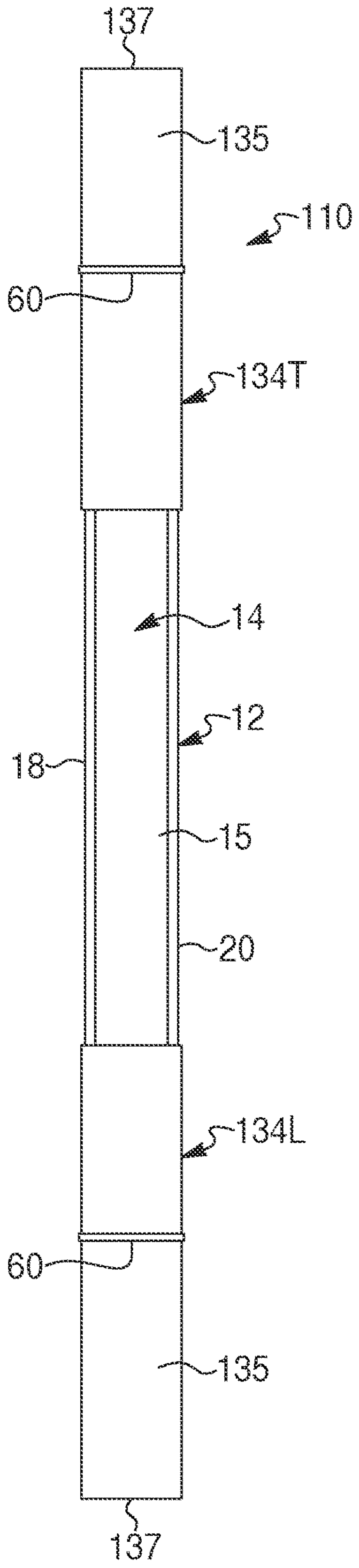
FIG. 12A is a side view of the protective door package according to the second exemplary embodiment of the present invention.
Figure 12B:
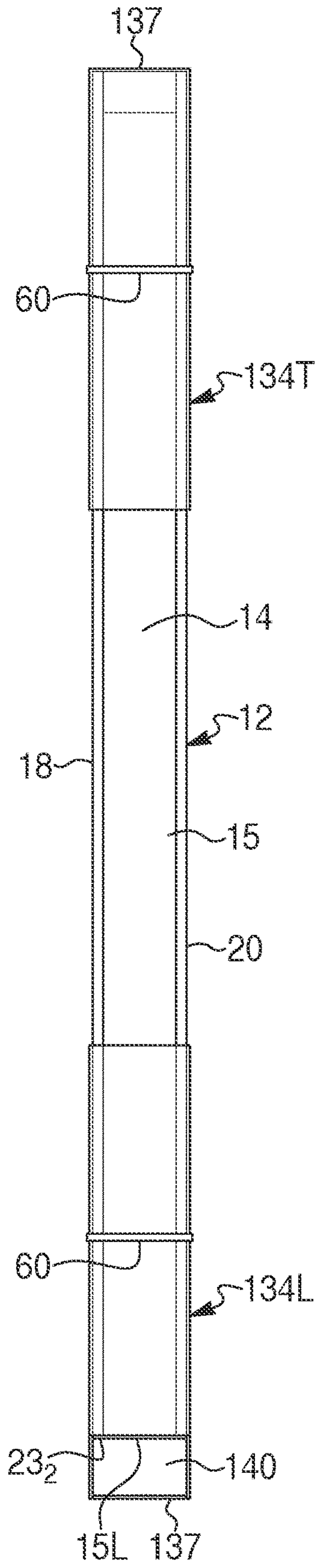
FIG. 12B is a side view of the protective door package according to the second exemplary embodiment of the present invention shown partially in phantom lines.
Figure 13B:
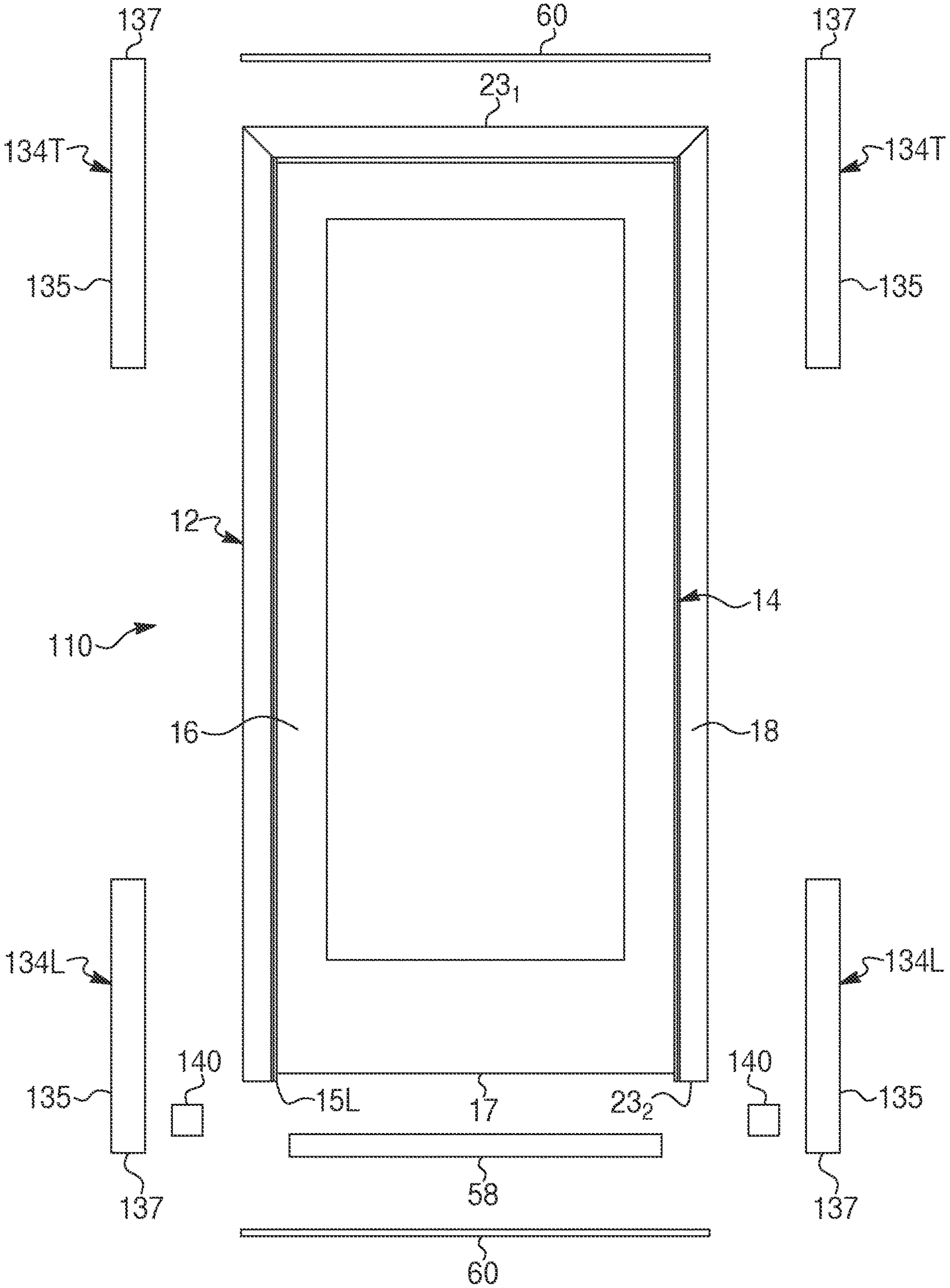
FIG. 13B is an exploded front elevation view of the protective door package according to the second exemplary embodiment.
Figure 14A:
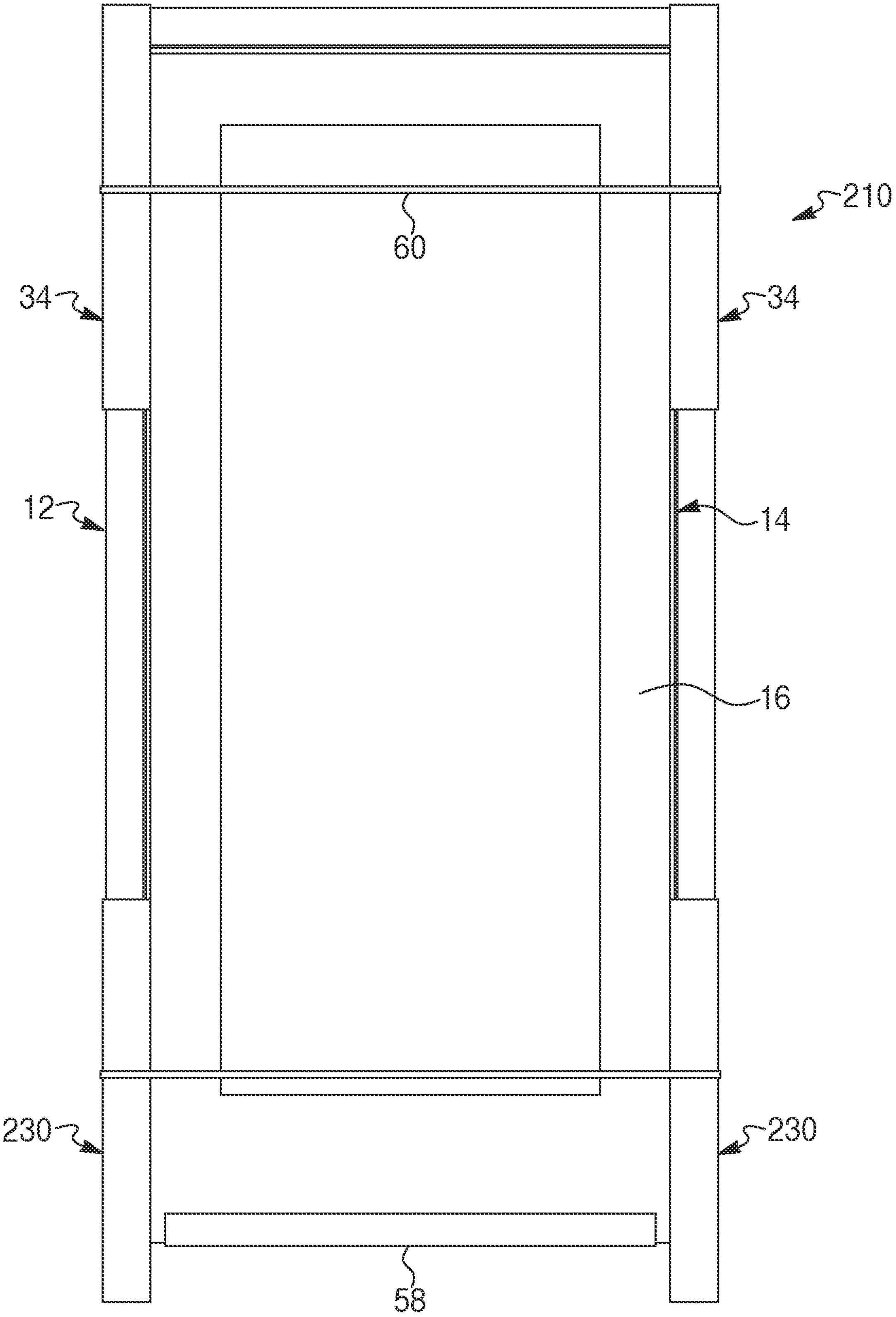
FIG. 14A is a front view of the single unit protective door package of the single prehung door assembly according to a third exemplary embodiment of the present invention.
Figure 14B:
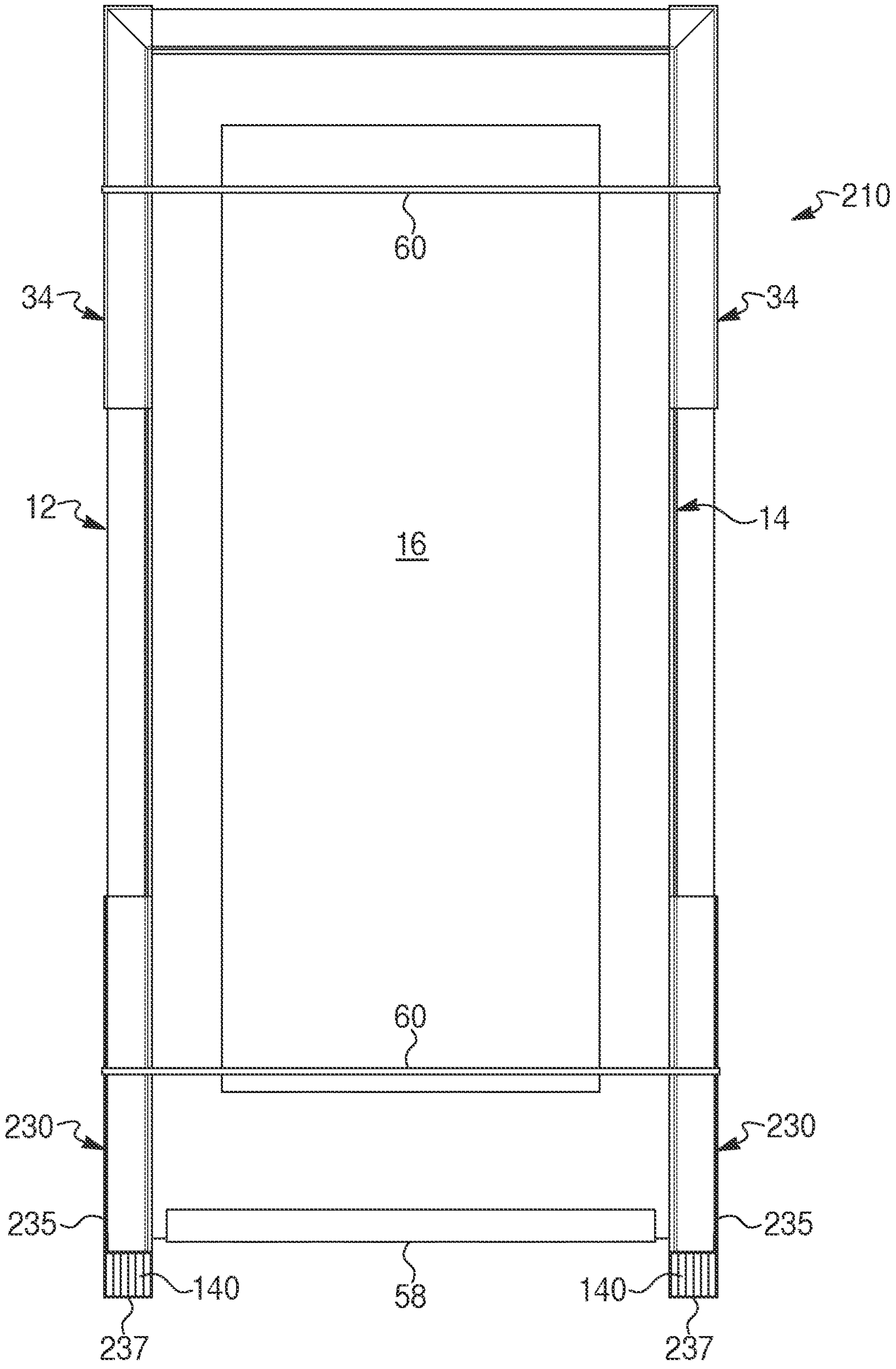
FIG. 14B is a front view of the protective door package according to the third exemplary embodiment shown partially in phantom lines.
Figure 15A:
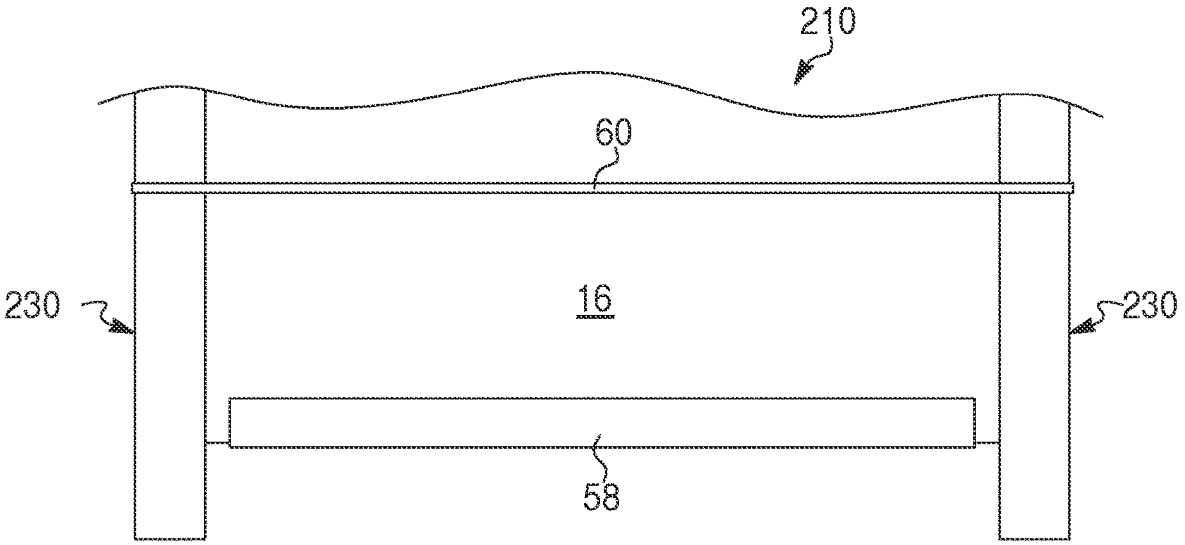
FIG. 15A is a fragmentary front view of a lower portion of the protective door package according to the third exemplary embodiment.
Figure 15B:
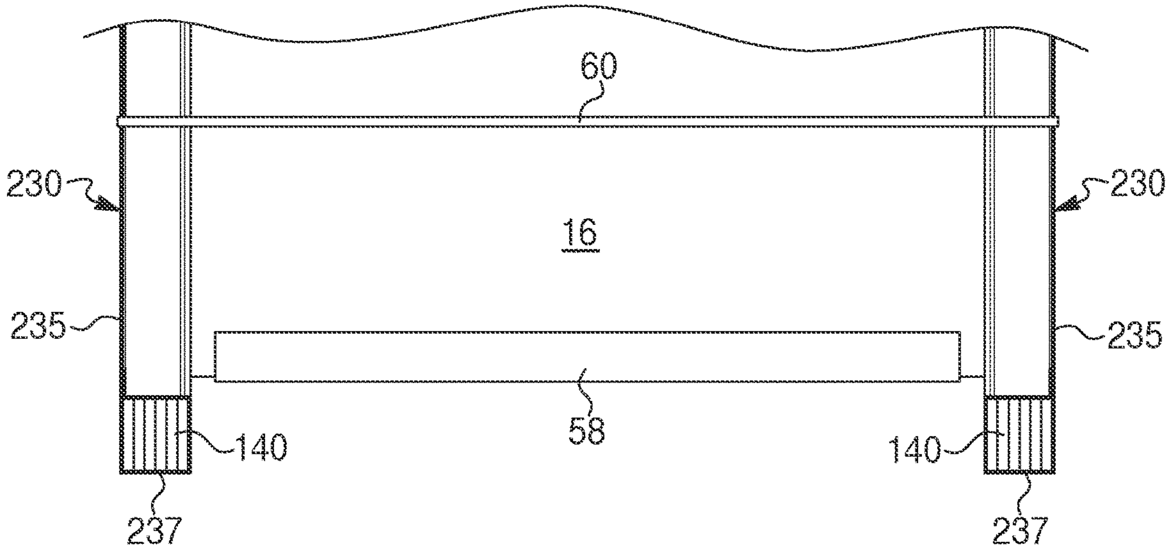
FIG. 15B is a fragmentary front view of the lower portion of the protective door package according to the third exemplary embodiment shown partially in phantom lines.
Figure 16A:
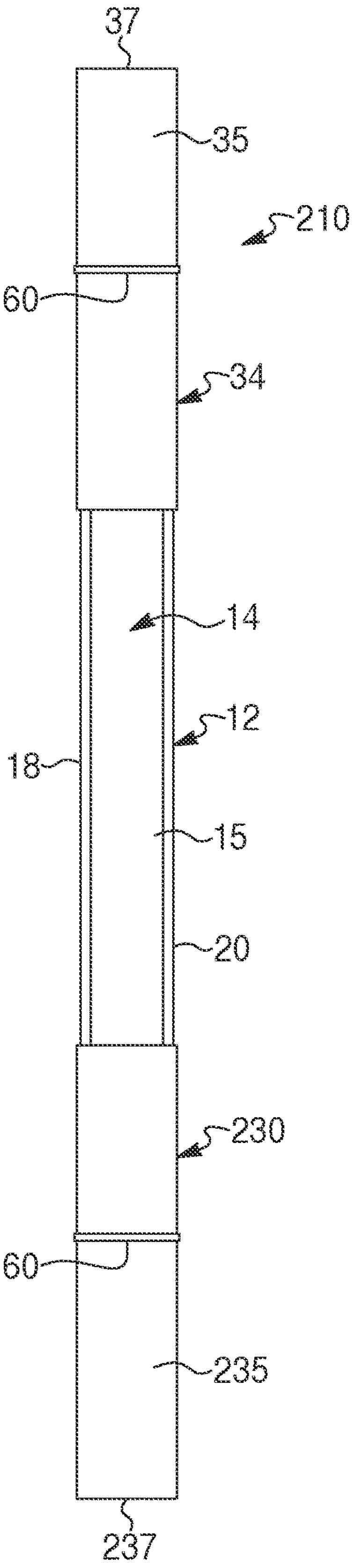
FIG. 16A is a side view of the protective door package according to the third exemplary embodiment of the present invention.
Figure 16B:
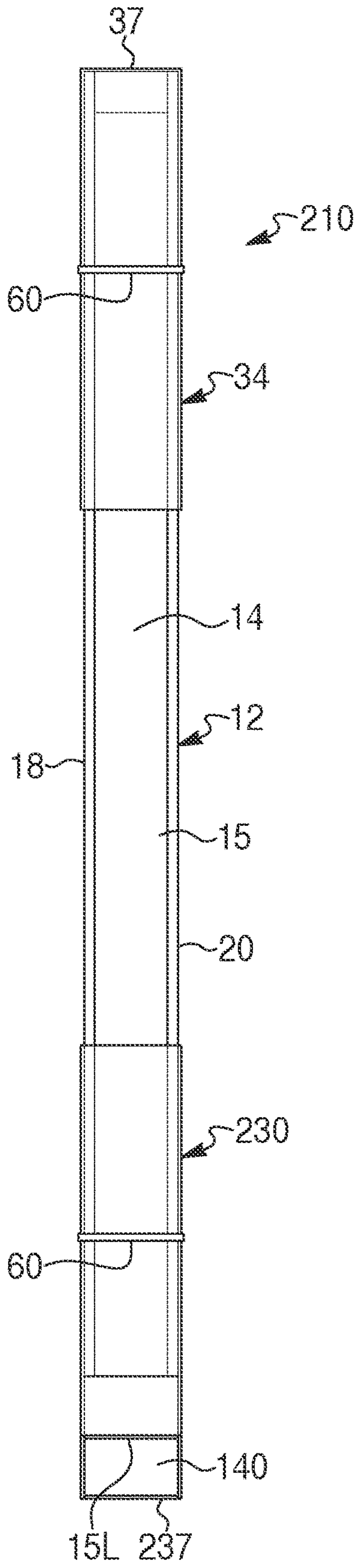
FIG. 16B is a side view of the protective door package according to the third exemplary embodiment of the present invention shown partially in phantom lines.

First, one of the support spacers 140 is placed into each of the lower protective side caps 134L, as best shown in FIG. 12B, so as to contact the end panel 137.

Next, the lower protective side caps 134L are positioned onto the prehung door assembly 12. As best shown in FIG. 10A-12B, the lower protective side caps 134L are positioned about the prehung door assembly 12 adjacent to the lowermost edges 15L of the door frame 14 and the lowermost edges $\mathbf{23}_2$ of the front and back moldings 18F, 18B. Thus, each of the support spacers 140 is disposed between the end panel 137 of one the lower protective side caps 134L and the lowermost edge 15L of the door frame 14 and the lowermost edge $\mathbf{23}_2$ of the front and back moldings 18F, 18B. Accordingly, the lower protective side caps 134L are disposed outside the door frame 14. When in position about the door assembly 12, the base panel 135 of each of the lower protective side caps 134L engages the outer side edges 24, 26 of the front and back moldings 18F, 18B and covers the door frame channel 22 between the moldings 18F, 18B. The side panels 136 of the lower protective side caps 134L engage outer surfaces of the front and back moldings 18F, 18B.

Then, the lower protective side caps 134L are secured in position about the prehung door assembly 12 by tightening at least a first strap 60. Also, the door base protector 58 is mounted to the bottom edge 17 of the door slab 16, such as through a friction fit, adhesive, or adhesive tape. Thus, the lower protective side caps 134L, when secured in position about the door assembly 12 by the tightening straps 60, cover and offer a degree of protection to the front and back moldings 18 in the lower corner regions of the door assembly 12.

Next, the upper protective side caps 134T are placed onto the prehung door assembly 12. As best shown in FIG. 10A-12B, the upper protective side caps 134T are positioned about the prehung door assembly 12 adjacent to the uppermost edge $\mathbf{23}_1$ of the front and back moldings 18F, 18B of the door assembly 12. When in position about the door assembly 12, the base panel 135 and the end panel 137 of each of the upper protective side caps 134T engages the outer side edges 24, 26 of the front and back moldings 18F, 18B and covers the door frame channel 22 between the moldings 18F, 18B. The side panels 136 of the upper protective side caps 134T engage outer surfaces of the front and back moldings 18F, 18B.

Then, the upper protective side caps 134T are secured in position about the prehung door assembly 12 by at least a first tightening strap 60. In this way, the upper protective side caps 134T, when secured in position about the door assembly 12 by the tightening strap 60, cover and offer a degree of protection to the front and back moldings 18F, 18B in the upper corner regions of the door assembly 12.

As with the first embodiment, a plurality, such as five, of the single unit protective door packages 110 of the second embodiment may be unitized to form a unitized door packaging (not shown) of the single unit protective door packages 110. To assemble the unitized door packaging, the individual single unit protective door packages 110 are horizontally or vertically stacked, i.e., horizontally or vertically arranged next to and in contact with each other. As with the door packages 10, the door packages 110 may be stacked vertically or horizontally. The stacked single unit protective door packages 110 are secured in a stacked position by at least top and bottom tightening straps. The tightening straps resemble the straps 60 but are longer and have a greater tensile strength in order to hold the united packaging together during shipping and handling, such as onto and off a transport vehicle or truck.

A single unit protective door package 210 for a single prehung door assembly 12 according to a third exemplary embodiment is illustrated in FIGS. 14A-18C. The single unit protective door package 210 of FIGS. 14A-18C corresponds substantially to the single unit protective door package 110 of FIGS. 10A-13B, and only portions of the single unit protective door package 210 which differ will therefore be explained in detail below.

Figure 17A:
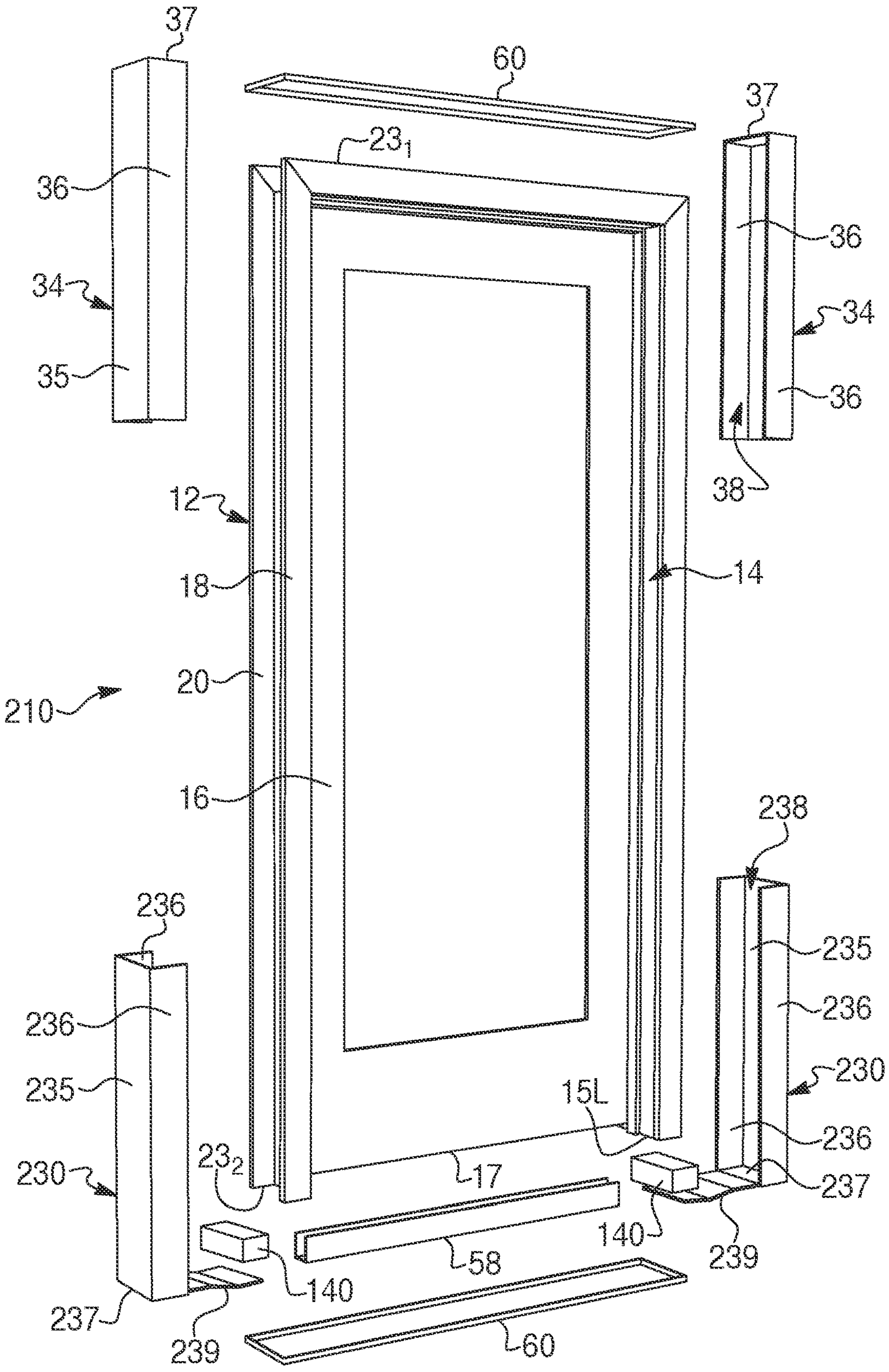
FIG. 17A is an exploded perspective view of the protective door package according to the third exemplary embodiment.
Figure 17B:
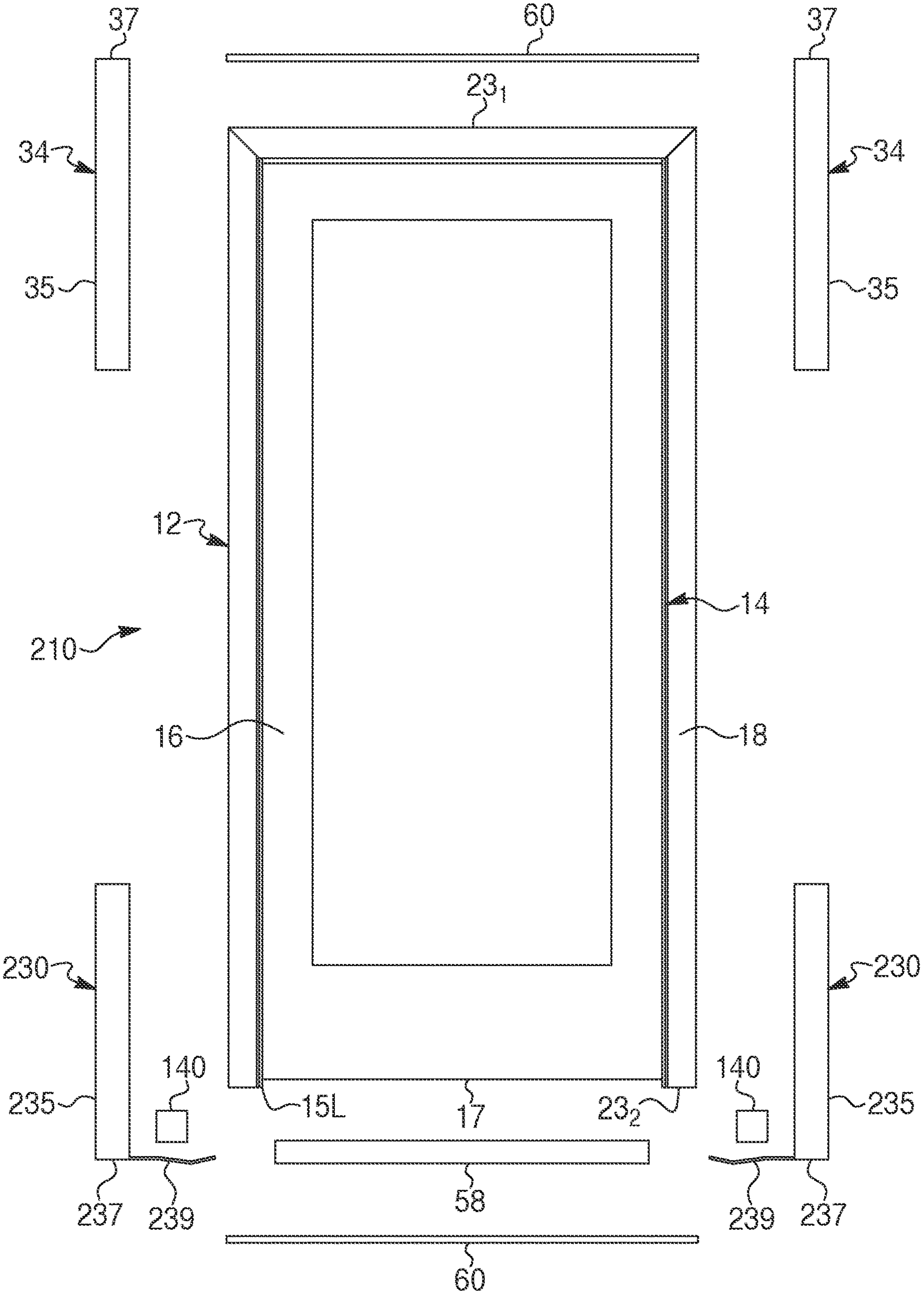
FIG. 17B is an exploded front elevation view of the protective door package according to the third exemplary embodiment.
Figure 18A:
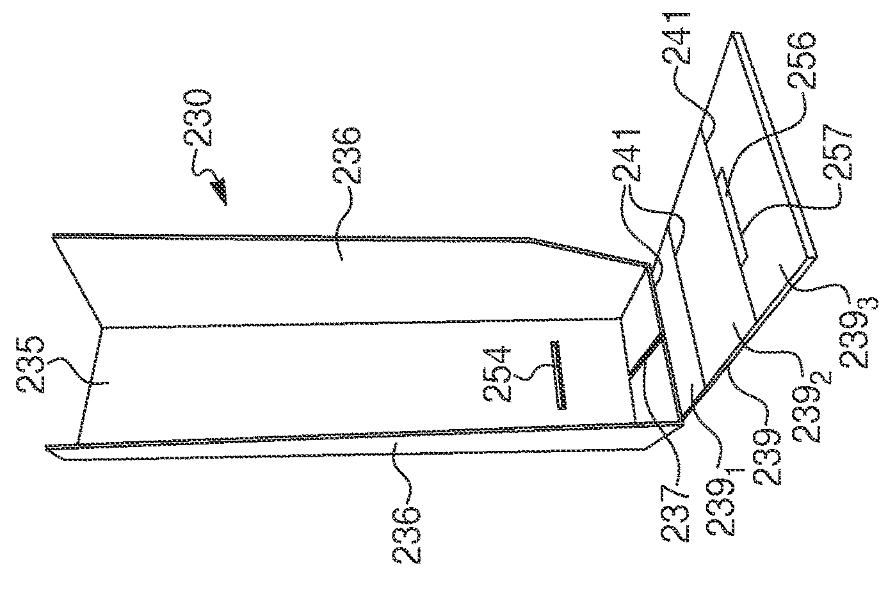
FIG. 18A is an exploded perspective view of a lower protective side cap according to the third exemplary embodiment with an extension panel in an unfolded configuration.

The single unit protective door package 210 comprises a pair of lower protective side caps 230 mounted adjacent the lowermost edges $\mathbf{23}_2$ of the front and back moldings 18F, 18B and the lowermost edge 15L of the door frame 14, as best shown in FIGS. 14A-15B. The protective door package 210 may further comprise a pair of upper protective side caps 34 mounted adjacent the uppermost edge $\mathbf{23}_1$ of the front and back moldings 18F, 18B, as best shown in FIGS. 14A, 14B and 16A-17B. As with the protective side caps 30 and 34 of the first exemplary embodiment, the protective side caps 34 and 230 are preferably formed from a corrugated cardboard material. It will be appreciated that other materials may be used for manufacturing the protective side caps 34 and 230. Each of the lower protective side caps 230 includes a base panel 235, two parallel side panels 236, and an end panel 237, together forming therebetween a rectangular U-shaped open cavity 238. Cavity 238 is closed at one end by the end panel 237, as best shown in FIGS. 17A and 17B. The base panel 235 is formed with a slot 254 therethrough, as best shown in FIGS. 18A-18C.

The single unit protective door package 210 further comprises a pair of structurally and geometrically identical support spacers 140. The spacers 140 are mounted to the door frame 14 and extend away from the lowermost edges $\mathbf{23}_2$ of the front and back moldings 18F, 18B and from the lowermost edges 15L of the door frame 14, as best shown in FIGS. 14B, 15B, 17A and 17B. Each of the support spacers 140 is preferably in the form of a hexahedron, such as a cube or rectangular cuboid, as best shown in FIG. 17A. Each of the support spacers 140 is disposed in the lower protective side caps 230 so as to be in contact with the end panel 237. The support spacers 140 are made of corrugated cardboard, corrugated cardboard block, plastic material, foam, rubber, honeycomb block, etc., that has been rolled, folded or otherwise formed into rectangular cuboid configuration. In that configuration, the corrugations are oriented vertically, and their collective orientation is sufficient to support door package 210. Each of the spacers 140 may include a cardboard sleeve encircling the rectangular cuboid in order to maintain it in that configuration.

Each of the lower protective side caps 230 further includes an extension panel 239 including three extension sections: a proximal extension section $\mathbf{239}_1$ adjacent to the end panel 237, a middle extension section $\mathbf{239}_2$, and a distal extension section $\mathbf{239}_3$. The extension sections $\mathbf{239}_1$-$\mathbf{239}_3$ are connected to each other by fold lines 241, as best shown in FIGS. 17A-18C. In turn, the extension section $\mathbf{239}_1$ is connected to the end panel 237 by one of the fold lines 241, as best shown in FIGS. 18A-18C.

Figure 18B:
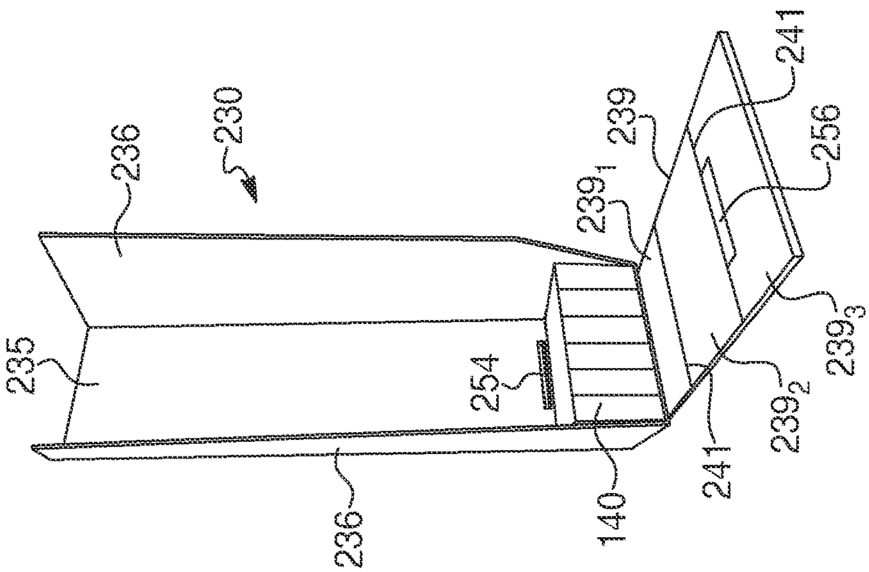
FIG. 18B is an exploded front elevation view of the lower protective side cap according to the third exemplary embodiment with a support spacer.
Figure 18C:
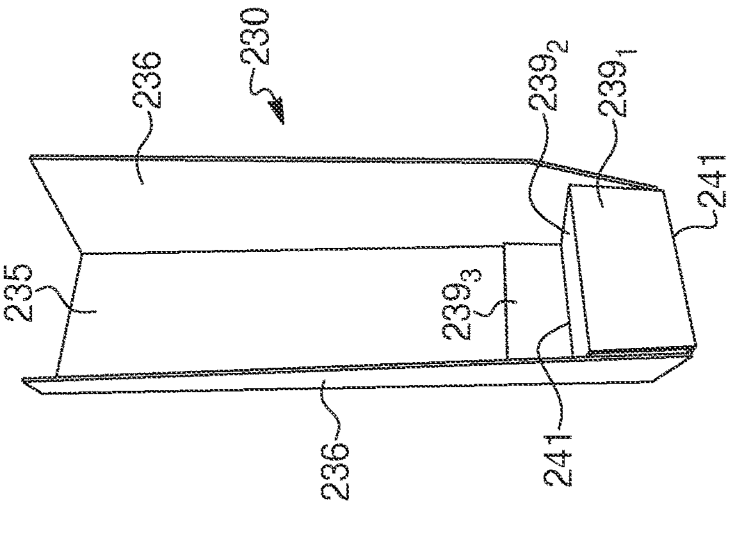
FIG. 18C is an exploded front elevation view of the lower protective side cap according to the third exemplary embodiment with the extension panel in a folded configuration.

The extension sections $\mathbf{239}_1$-$\mathbf{239}_3$ of the extension panel 239 are foldable relative to each other and the end panel 237 so as to wrap over (or encapsulate) the spacer 140, as best shown in FIGS. 18B and 18C. In other words, the fold lines 241 divide the extension panel 239 into the extension sections $239_1$-$239_3$ arranged to be folded approximately 90° relative to each other and the end panel 237 to define an end box of generally rectangular cross section configured to house the spacer 140 therewithin, i.e., to transfer the extension panel 239 from an open (i.e., flat or unfolded) configuration to a folded configuration. Accordingly, FIGS. 17A-18B show the extension panel 239 in the open configuration, while FIG. 18C shows the extension panel 239 in the folded configuration. Moreover, the middle extension section $239_2$ of the extension panel 239 is provided with a tab 256 complementary to the slot 254 in the base panel 235, as best shown in FIGS. 18A-18C. Furthermore, the tab 256 may be formed by a cut line 257, a series of perforations, or the like.

The upper protective side caps 34 are mounted onto the door frame 14 of the door assembly 12 at the uppermost edges $23_1$ of the front and back moldings 18F and 18B. Accordingly, the front and back moldings 18F and 18B are disposed in the open cavity 38 of the upper protective side caps 34. Moreover, when mounted to the door frame 14, the base panel 35 engages the outer side edges 24 and 26 of the front and back moldings 18F and 18B, while the end panel 37 engages the uppermost edges $23_1$ of the front and back moldings 18F, 18B. The lower protective side caps 230 are mounted to the door frame 14 of the door assembly 12 at the lowermost edges $23_2$ of the front and back moldings 18F and 18B, so that the front and back moldings 18F and 18B are positioned in the open cavity 238 of the lower protective side caps 230. Moreover, when mounted to the door frame 14, the base panel 235 of the lower protective side caps 230 engages the outer side edges 24 and 26 of the front and back moldings 18F and 18B, while the end panel 237 is spaced from the lowermost edges $23_2$ of the front and back moldings 18F, 18B and from the lowermost edges 15L of the door frame 14, as illustrated in FIGS. 14B, 15B, 17A and 17B.

A method of packaging the prehung door assembly 12 into the single unit protective door package 210 of the second exemplary embodiment follows.

First, the width of the protective side caps 34 and 230 needed for the protective door package 210 is determined. For example, 4⅞" protective side caps are selected for 3⅝" split jamb units (i.e., door assemblies) with casing, 5⅞" protective side for 4⅝" split jambs units with casing or for 4⅞" flat jamb units. Then, the proper size honeycomb support spacers 140 are inserted into the lower protective side caps 230 and placed on the end panel 237 within the channel 238 so as to ensure the spacer 140 fits side-to-side. Next, the proximal extension section $239_1$ of the lower protective side caps 230 is folded up, the middle extension section $239_2$ is bent horizontally, and the distal extension section $239_3$ of the extension panel 239 is bent upward. Then, the tab 256 is separated from the distal extension section $239_3$ along the cut line 257 and inserted into the slot 254 in the base panel 235 of the lower protective side caps 230 to secure the middle extension section $239_2$ of the extension panel 239 to the base panel 235 of the lower protective side caps 230.

Then, the lower protective side caps 230 are mounted to the left and right lower corners of the door frame 14 so that the support spacers 140 are under the lowermost edge 15L of the door frame 14 and are separated therefrom by the middle extension section $239_2$ of the lower protective side caps 230. Next, the packaging strap 60 is applied to the door assembly 12 as close as possible to the lowermost edge 15L of the door frame 14 to secure the lower protective side caps 230 in position on the door assembly 12. Alternatively, another packaging strap 60 may be applied above the first packaging strap 60. The user has to ensure that both packaging straps 60 are secured. Then, the upper protective side caps 34 are mounted to the door assembly 12 at the opposite upper corners 28R and 28L of the door frame 14, and one or two packaging straps 60 are applied to secure the upper protective side caps 34 on the door assembly 12. After that the single unit protective door package 210 is placed on a cart and verified that the lower protective side caps 230 with the support spacers 140 are secured.

After several of the single unit protective door packages 210 are prepared (e.g., 7 or 8), they are moved to a wrapper turnstile and grouped together in a pack of the protective door packages 210. Once all protective door packages 210 are on the turnstile, the protective door packages 210 are oriented vertical and square, aligned evenly, left to right, so that the hinges are in line with the jamb of the adjacent protective door package 210, and a clamp is placed near the top and tightened. Next, another clamp is placed on the opposite side of the first clamp slightly below the center of the pack and tightened. Then a banding strap is provided, slightly longer than one side of the pack of the protective door packages 210, and stapled to each door, keeping the strap tight to help keep the doors from falling when a customer removes the shrink wrap and top banding strap. Then another banding strap is cut slightly longer than the circumference of the pack of the protective door packages 210. This strap is placed around the top of the pack of the protective door packages 210 in-line with the header jamb. This location allows the strap to be tightened more and provides more stability to the pack when the clamps are removed. Once fully around the pack of the protective door packages 210, the top strap is tightened. Then, the clamp is removed. Once the tightening process is completed, the excess strapping may be cut. Then the other clamp is removed. After that, the pack of the protective door packages 210 is shrink wrapped to form the unitized door packaging of a plurality of the single unit protective door packages 230.

The protective door package of the present invention improves door packaging quality, protects prehung door assemblies from damage during shipping and handling, and eliminates the need for a wood pallet holding the protective door package.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A single unit protective door package for packaging of a prehung door assembly, the single unit protective door package comprising:

a single prehung door assembly comprising a rectangular door frame and a door slab pivotally attached to the door frame, the door frame including right and left side jambs and a header jamb connecting upper ends of the right and left side jambs;

a pair of upper protective side caps each mounted to the single prehung door assembly at one of opposite upper corners of the door frame;

a pair of lower protective side caps each mounted to the single prehung door assembly at one of lowermost edges of the door frame;

a pair of support spacers each mounted to one of the lowermost edges of the single prehung door assembly for elevating a bottom edge of the door slab above the ground; and at least a first strap encircling the single prehung door assembly about at least one of the upper protective side caps or the lower protective side caps, wherein each of the support spacers includes a base member having a planar bottom surface adapted to engage a floor surface, and a planar top surface parallel to the planar bottom surface and configured to engage one of the lowermost edges of the door frame, and wherein each of the support spacers further includes a planar connecting member and at least one planar support member extending outwardly from the top surface, and wherein one of the right and left side jambs of the door frame is disposed between the least one planar support member and the connecting member of each of the support spacers.

2. The single unit protective door package as defined in claim 1, wherein the door frame includes a door stop member fixed on at least the side jambs, and wherein each of the support spacers includes two support members spaced from one another a distance sufficient to receive the door stop member therebetween.

3. The single unit protective door package as defined in claim 1, wherein each of the planar connecting member and the at least one planar support member are oriented to extend parallel to the associated jamb.

4. A single unit protective door package for packaging of a prehung door assembly, the single unit protective door package comprising:

a single prehung door assembly comprising a rectangular door frame and a door slab pivotally attached to the door frame, the door frame including right and left side jambs and a header jamb connecting upper ends of the right and left side jambs;

a pair of upper protective side caps each mounted to the single prehung door assembly at one of opposite upper corners of the door frame;

a pair of lower protective side caps each mounted to the single prehung door assembly at one of lowermost edges of the door frame;

a pair of support spacers each mounted to one of the lowermost edges of the single prehung door assembly for elevating a bottom edge of the door slab above the ground; and at least a first strap encircling the single prehung door assembly about at least one of the upper protective side caps or the lower protective side caps, wherein each of the upper and lower protective side caps includes a base panel, two side panels and an end panel together forming a U-shaped cavity closed at one end by the end panel, and wherein the right and left side jambs of the door frame are disposed in the U-shaped cavity between the two side panels of each of the upper and lower protective side caps, and wherein each of the support spacers is disposed between the end panel of one of the pair of lower protective side caps and at least one of the side jambs of the door frame.

5. The single unit protective door package as defined in claim 4, wherein each of the support spacers is a hexahedron disposed between the end panel of one the pair of lower protective side caps and one of the lowermost edges of the door frame.

6. The single unit protective door package as defined in claim 4, wherein each of the lower protective side caps further includes an extension panel including a proximal extension section adjacent to the end panel, a distal extension section, and a middle extension section disposed between the proximal and distal extension sections, wherein the extension sections are connected to each other by folding lines, and wherein the extension sections of the extension panel are foldable relative to each other and the end panel so as to wrap over the spacer.

7. A unitized door packaging of a plurality of single unit protective door packages packaging a single prehung door assembly, the single prehung door assembly comprising a rectangular door frame and a door slab pivotally attached to the door frame, the door frame including right and left side jambs and a header jamb connecting upper ends of the right and left side jambs, the unitized door packaging comprising:

the plurality of the single unit protective door packages stacked and aligned with each other, each of the single unit protective door packages comprising a single prehung door assembly including a pair of upper protective side caps each configured to be mounted to the single prehung door assembly at one of opposite upper corners of the door frame, a pair of lower protective side caps each configured to be mounted to the door assembly at one of lowermost edges of the door frame and a pair of support spacers each mounted to one of the lowermost edges of the door frame for elevating a bottom edge of the door slab above the ground; and top and bottom tightening straps securing the plurality of stacked single unit protective door packages together by encircling the stacked single unit protective door packages over the upper and lower protective side caps, respectively, of the stacked single unit protective door packages;

the single unit protective door packages are aligned with each other so that bottom surfaces of the support spacers of the single unit protective door packages are aligned, wherein each of the support spacers includes a base member having a bottom surface adapted to engage a floor surface, and a top surface configured to engage one of the lowermost edges of the door frame of an associated single unit protective door package, and wherein each of the support spacers further includes a connecting member and at least one support member extending outwardly from the top surface and wherein one of the right and left side jambs of each of the door frames is disposed between the least one support member and the connecting member of each of the support spacers.

8. The unitized door packaging as defined in claim 7, wherein each of the support spacers has upper and lower parallel support surfaces.

9. A unitized door packaging of a plurality of single unit protective door packages, packaging a single prehung door assembly, the single prehung door assembly comprising a rectangular door frame and a door slab pivotally attached to the door frame, the door frame including right and left side jambs and a header jamb connecting upper ends of the right and left side jambs, the unitized door packaging comprising:

the plurality of the single unit protective door packages stacked and aligned with each other, each of the single unit protective door packages comprising a single prehung door assembly including a pair of upper protective side caps each configured to be mounted to the single prehung door assembly at one of opposite upper corners of the door frame, a pair of lower protective side caps each configured to be mounted to the door assembly at one of lowermost edges of the door frame and a pair of support spacers each mounted to one of the lowermost edges of the door frame for elevating a bottom edge of the door slab above the ground; and top and bottom tightening straps securing the plurality of stacked single unit protective door packages together by encircling the stacked single unit protective door packages over the upper and lower protective side caps, respectively, of the stacked single unit protective door packages;

the single unit protective door packages are aligned with each other so that bottom surfaces of the support spacers of the single unit protective door packages are aligned, wherein each of the prehung door assemblies further comprises front and back moldings connected to opposite front and back edges of the door frames, wherein each of the upper and lower protective side caps includes a base panel, two side panels and an end panel together forming a U-shaped cavity closed at one end by the end panel, wherein the front and back moldings are disposed in the U-shaped cavity, wherein the end panel of each of the upper protective side caps faces the uppermost edges of the front and back moldings, and wherein the end panel of each of the lower protective side caps faces the lowermost edge of one of the front and back moldings, and wherein each of the support spacers is disposed between the end panel of one of the lower protective side caps and one of the side jambs of each of the door frames and one of the front and back moldings.

10. The unitized door packaging as defined in claim 9, wherein each of the support spacers is a hexahedron disposed in one the lower protective side caps and engages one of the lowermost edges of each of the door frames and one of the lowermost edges of the front and back moldings.

11. A method of assembling a protective door package of a prehung door assembly, the method comprising:

providing a prehung door assembly comprising a rectangular door frame and a door slab pivotally attached to the door frame, the door frame including right and left side jambs and a header jamb connecting upper ends of the right and left side jambs;

mounting support spacers at one of the right and left side jambs of the door frame so as to extend away from the lowermost edge of the door frame;

mounting upper protective side caps to the door assembly at opposite upper corners of the door frame; and securing the upper and lower protective side caps to the prehung door assembly by encircling the prehung door assembly with top and bottom tightening straps over the lower and upper protective side caps, wherein each of the support spacers includes a base member having a bottom surface adapted to engage a floor surface, and a top surface, and wherein the step of mounting one of the support spacers includes the step of attaching the lowermost edge of each of the side jambs of the door frame to the top surface of one of the support spacers, and wherein each of the support spacers further includes a connecting member and at least one support member extending outwardly from the top surface, wherein the step of mounting one of the support spacers includes the step of placing the lowermost edge of each of the right and left side jambs of the door frame between the least one planar support member and the connecting member of one of the support spacers.

12. A method of assembling a protective door package of a prehung door assembly, the method comprising:

providing a prehung door assembly comprising a rectangular door frame and a door slab pivotally attached to the door frame, the door frame including right and left side jambs and a header jamb connecting upper ends of the right and left side jambs;

mounting support spacers at one of the right and left side jambs of the door frame so as to extend away from the lowermost edge of the door frame;

mounting upper protective side caps to the door assembly at opposite upper corners of the door frame; and securing the upper and lower protective side caps to the prehung door assembly by encircling the prehung door assembly with top and bottom tightening straps over the lower and upper protective side caps, wherein each of the support spacers includes a base member having a bottom surface adapted to engage a floor surface, and a top surface, and wherein the step of mounting one of the support spacers includes the step of attaching the lowermost edge of each of the side jambs of the door frame to the top surface of one of the support spacers, and wherein the door frame includes a door stop member fixed on at least the side jambs, wherein each of the support spacers includes two support members spaced from one another a distance sufficient to receive the door stop member therebetween, and wherein the step of mounting one of the support spacers includes the step of placing the door stop member between the two support members of one of the support spacers.

13. A method of assembling a protective door package of a prehung door assembly, the method comprising:

providing a prehung door assembly comprising a rectangular door frame and a door slab pivotally attached to the door frame, the door frame including right and left side jambs and a header jamb connecting upper ends of the right and left side jambs;

mounting support spacers at one of the right and left side jambs of the door frame so as to extend away from the lowermost edge of the door frame;

mounting upper protective side caps to the door assembly at opposite upper corners of the door frame; and securing the upper and lower protective side caps to the prehung door assembly by encircling the prehung door assembly with top and bottom tightening straps over the lower and upper protective side caps, wherein the prehung door assembly further comprises front and back moldings connected to opposite front and back edges of the door frame, wherein each of the upper and lower protective side caps includes a base panel, two side panels and an end panel together forming therebetween a U-shaped cavity closed at one end by the end panel, and wherein the steps of mounting one of the upper and lower protective side caps and one of the support spacers to the door assembly includes placing one of the right and left side jambs in the U-shaped cavity between the two side panels of each of the upper and lower protective side caps, and wherein the step of mounting one of the support spacers to the door assembly includes positioning each of the support spacers between the end panel of one the lower protective side caps and one of the side jambs of the door frame.

14. The method as defined in claim 13, wherein each of the support spacers is a hexahedron, and wherein the step of mounting one of the support spacers to the door assembly includes positioning each of the support spacers between the end panel of one the lower protective side caps and one of the lowermost edges of the door frame and one of the lowermost edges of the front and back moldings.

15. The method as defined in claim 13, wherein each of the lower protective side caps further includes an extension panel including a proximal extension section adjacent to the end panel, a distal extension section, and a middle extension section disposed between the proximal and distal extension sections, wherein the extension sections are connected to each other by folding lines, and wherein the extension sections of the extension panel are foldable relative to each other and the end panel.

16. The method as defined in claim 13, wherein the step of mounting one of the support spacers to the door assembly includes positioning each of the support spacers on the end panel within the channel, folding up the proximal extension section of the lower protective side caps, bending the middle extension section horizontally, and bending the distal extension section of the extension panel upward so as to wrap the extension panel over the spacer.

17. The method as defined in claim 16, wherein the middle extension section of the extension panel is provided with a tab complementary to a slot in the base panel, and wherein the step of mounting one of the support spacers to the door assembly further includes inserting the tab into the slot in the base panel of the lower protective side caps to secure the middle extension section of the extension panel to the base panel of the lower protective side caps.

18. A method of assembling a protective door package of a prehung door assembly, the method comprising:

providing a prehung door assembly comprising a rectangular door frame and a door slab pivotally attached to the door frame, the door frame including right and left side jambs and a header jamb connecting upper ends of the right and left side jambs;

mounting support spacers at one of the right and left side jambs of the door frame so as to extend away from the lowermost edge of the door frame;

mounting upper protective side caps to the door assembly at opposite upper corners of the door frame; and securing the upper and lower protective side caps to the prehung door assembly by encircling the prehung door assembly with top and bottom tightening straps over the lower and upper protective side caps, wherein the prehung door assembly further comprises front and back moldings connected to opposite front and back edges of the door frame, wherein each of the upper and lower protective side caps includes a base panel, two side panels and an end panel together forming therebetween a U-shaped cavity closed at one end by the end panel, and wherein the steps of mounting one of the upper and lower protective side caps and one of the support spacers to the door assembly includes placing one of the right and left side jambs in the U-shaped cavity between the two side panels of each of the upper and lower protective side caps, and wherein each of the lower protective side caps further includes an extension panel including a proximal extension section adjacent to the end panel, a distal extension section, and a middle extension section disposed between the proximal and distal extension sections, wherein the extension sections are connected to each other by folding lines, and wherein the extension sections of the extension panel are foldable relative to each other and the end panel.

19. The method as defined in claim 18, wherein the step of mounting one of the support spacers to the door assembly includes positioning each of the support spacers on the end panel within the channel, folding up the proximal extension section of the lower protective side caps, bending the middle extension section horizontally, and bending the distal extension section of the extension panel upward so as to wrap the extension panel over the spacer.

20. The method as defined in claim 19, wherein the middle extension section of the extension panel is provided with a tab complementary to a slot in the base panel, and wherein the step of mounting one of the support spacers to the door assembly further includes inserting the tab into the slot in the base panel of the lower protective side caps to secure the middle extension section of the extension panel to the base panel of the lower protective side caps.

21. A method of assembling a unitized door packaging of a plurality of single unit protective door packages, the single prehung door assembly comprising a rectangular door frame and a door slab pivotally attached to the door frame, the door frame including right and left side jambs and a header jamb connecting upper ends of the right and left side jambs, the method comprising:

providing a plurality of single unit protective door packages, each of the single unit protective door packages comprising a pair of upper protective side caps each mounted to the door assembly at one of opposite upper corners of the door frame, a pair of lower protective side caps each mounted to the door assembly at one of lowermost edges of the door frame and a pair of support spacers each mounted to one of the lowermost edges of the door frame for elevating a bottom edge of the door slab above the ground, stacking a plurality of the single unit protective door packages, aligning the stacked plurality of the single unit protective door packages, and securing the stacked plurality of the single unit protective door packages by top and bottom tightening straps encircling the stacked plurality of the single unit protective door packages over the upper and lower protective side caps, respectively, wherein each of the support spacers includes a base member having a bottom surface adapted to engage a floor surface, and a top surface and configured to engage the lowermost edge of one of the side jambs of one of the door frames.

22. The method as defined in claim 21, wherein each of the support spacers further includes a connecting member and at least one support member extending outwardly from the top surface, wherein the lowermost edge of each of the right and left side jambs of each of the door frame is disposed between the least one planar support member and the connecting member of one of the support spacers.

23. The method as defined in claim 22, wherein each of the support spacers is formed as an integral part.

24. A method of assembling a unitized door packaging of a plurality of single unit protective door packages, the single prehung door assembly comprising a rectangular door frame and a door slab pivotally attached to the door frame, the door frame including right and left side jambs and a header jamb connecting upper ends of the right and left side jambs, the method comprising:

providing a plurality of single unit protective door packages, each of the single unit protective door packages comprising a pair of upper protective side caps each mounted to the door assembly at one of opposite upper corners of the door frame, a pair of lower protective side caps each mounted to the door assembly at one of lowermost edges of the door frame and a pair of support spacers each mounted to one of the lowermost edges of the door frame for elevating a bottom edge of the door slab above the ground, stacking a plurality of the single unit protective door packages, aligning the stacked plurality of the single unit protective door packages, and securing the stacked plurality of the single unit protective door packages by top and bottom tightening straps encircling the stacked plurality of the single unit protective door packages over the upper and lower protective side caps, respectively, wherein the upper and lower protective side caps are formed from corrugated cardboard, wherein each of the upper and lower protective side caps include a base panel, two side panels and an end panel together forming therebetween a U-shaped cavity closed at one end by the end panel, and wherein the front and back moldings are disposed in the U-shaped cavity between the two side panels of each of the upper and lower protective side caps, wherein each of the support spacers is disposed between the end panel of one the lower protective side caps and one of the side jambs of the door frame and one of the front and back moldings, and wherein each of the support spacers is a hexahedron, and wherein each of the support spacers is disposed between the end panel of one the lower protective side caps and one of the lowermost edges of the door frame and one of the lowermost edges of the front and back moldings.

* * * * *